(12) United States Patent
Goss et al.

(10) Patent No.: US 10,534,122 B2
(45) Date of Patent: Jan. 14, 2020

(54) FIBER OPTIC SHELVING SYSTEM

(71) Applicant: Sunrise R&D Holdings, LLC, Cincinnati, OH (US)

(72) Inventors: John Christopher Goss, Morrow, OH (US); Gregory Daniel Noble, Loveland, OH (US); Kevin Michael Roa, Cincinnati, OH (US); Douglas Steven Meiser, Wilder, KY (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 129 days.

(21) Appl. No.: 15/491,096

(22) Filed: Apr. 19, 2017

(65) Prior Publication Data

US 2018/0306958 A1  Oct. 25, 2018

(51) Int. Cl.
| | |
|---|---|
| H04N 7/18 | (2006.01) |
| F21V 8/00 | (2006.01) |
| G06T 7/70 | (2017.01) |
| G06Q 10/08 | (2012.01) |
| A47F 10/02 | (2006.01) |

(52) U.S. Cl.
CPC ............ *G02B 6/0008* (2013.01); *A47F 10/02* (2013.01); *G06Q 10/087* (2013.01); *G06T 7/70* (2017.01); *H04N 7/181* (2013.01); *A47F 2010/025* (2013.01)

(58) Field of Classification Search
USPC ........................................................ 348/159
See application file for complete search history.

(56) References Cited

U.S. PATENT DOCUMENTS

| | | | | |
|---|---|---|---|---|
| 4,095,872 A | * | 6/1978 | Stieff | A45C 13/00 385/115 |
| 6,104,371 A | * | 8/2000 | Wang | G02B 6/001 345/102 |
| 7,233,241 B2 | | 6/2007 | Overhultz et al. | |

(Continued)

FOREIGN PATENT DOCUMENTS

| | | |
|---|---|---|
| DE | 9407032 U1 | 7/1994 |
| DE | 20302431 U1 | 4/2003 |

(Continued)

OTHER PUBLICATIONS

Kruger, Antonio et al., How Computing Will Change the Face of Retail, Computer, May 2011, pp. 86-89, vol. 44, Issue 4.
International Search Report dated Jun. 29, 2018.

*Primary Examiner* — Mikhail Itskovich
(74) *Attorney, Agent, or Firm* — Dinsmore & Shohl, LLP

(57) ABSTRACT

A fiber optic shelving system includes a shelf including a plurality of holes, a plurality of fiber optic filaments, each of the plurality of fiber optic filaments having a first end and a second end, and the first end being coupled to one of the plurality of holes, a holder configured to hold the second ends and expose terminal surfaces of the plurality of fiber optic filaments, a first camera configured to capture an image of the terminal surfaces of the plurality of fiber optic filaments, and a second camera configured to capture an image of a side of one or more products on the shelf. The fiber optic shelving system determines a number of products on the shelf based on the captured image of the terminal surfaces of the plurality of fiber optic filaments and the captured image of the side of one or more products on the shelf.

30 Claims, 26 Drawing Sheets

(56) References Cited

U.S. PATENT DOCUMENTS

| | | |
|---|---|---|
| 7,693,757 B2 | 4/2010 | Zimmerman |
| 8,321,304 B2 | 11/2012 | Khan et al. |
| 9,147,174 B2 | 9/2015 | Glickman et al. |
| 2005/0279722 A1 | 12/2005 | Ali |
| 2006/0178947 A1* | 8/2006 | Zsigmond ................. B07C 5/34 705/26.1 |
| 2009/0121017 A1* | 5/2009 | Cato .................... G06Q 10/087 235/385 |
| 2016/0123799 A1 | 5/2016 | Lambert et al. |
| 2016/0180629 A1 | 6/2016 | Chapman et al. |
| 2016/0328767 A1 | 11/2016 | Bonner et al. |

FOREIGN PATENT DOCUMENTS

| | | |
|---|---|---|
| WO | 2010017530 A2 | 2/2010 |
| WO | 2012015361 A1 | 2/2012 |

* cited by examiner

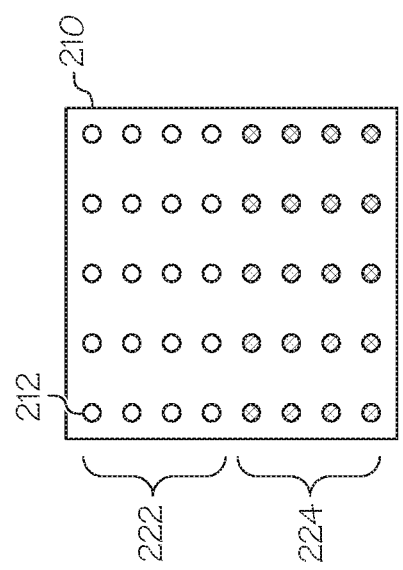
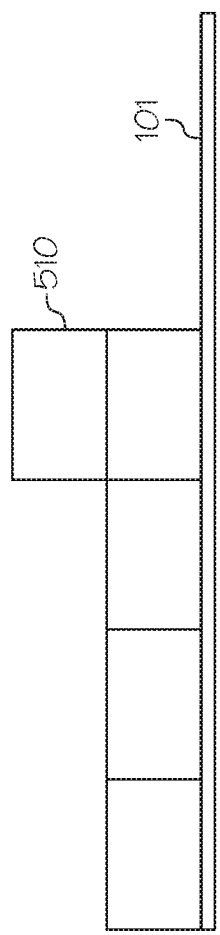

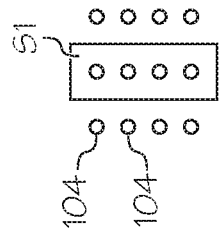
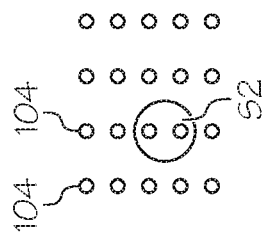
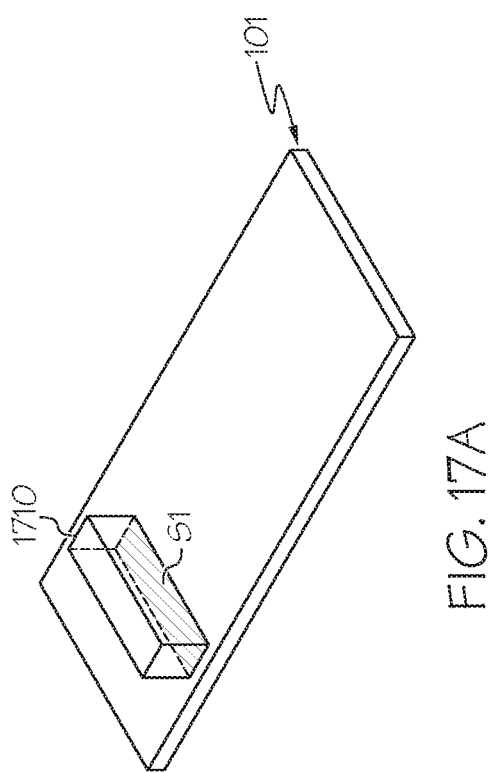
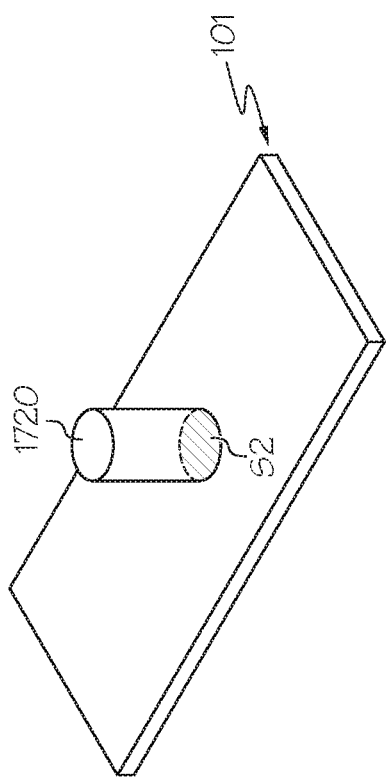

FIBER OPTIC SHELVING SYSTEM

TECHNICAL FIELD

The present disclosure relates to fiber optic shelving systems, and more particularly, to fiber optic shelving systems for determining the number of products and the location of products on shelves using fiber optic filaments connected to holes on the shelves.

BACKGROUND

Counting and tracking the amount of inventory on store shelves is a costly and time consuming endeavor in stores. Due to much of the space between shelves being filled with product in some configurations, there is a need to have a solution that occupies minimal shelf space. Some solutions use weight or cameras that image a product to calculate inventory. However, weight-based systems are expensive to implement. Image based systems may require images from above the product, which would be infeasible or significantly more expensive to obtain sufficient coverage when there is often little space between the top of the product and the shelf above the product.

Accordingly, there is a need for systems for automatically determining the number of products on store shelves.

SUMMARY

In one embodiment, a fiber optic shelving system includes a shelf including a plurality of holes on a top surface of the shelf, a plurality of fiber optic filaments, each of the plurality of fiber optic filaments having a first end and a second end, and the first end being coupled to one of the plurality of holes, a holder exposing terminal surfaces of the second ends of the plurality of fiber optic filaments, a first camera configured to capture an image of the terminal surfaces of the plurality of fiber optic filaments, and a second camera configured to capture an image of a side of one or more products on the shelf. The fiber optic shelving system also includes one or more processors communicatively coupled to the first camera and the second camera, one or more memory components communicatively coupled to the one or more processors, and machine readable instructions stored in the one or more memory components that, when executed by the one or more processors, cause the fiber optic shelving system to: determine the number of products on the shelf based on the captured image of the terminal surfaces of the plurality of fiber optic filaments and the captured image of the side of one or more products on the shelf.

In another embodiment, a fiber optic shelving system includes a first shelf including a first set of holes on a top surface of the first shelf, a second shelf including a second set of holes on a top surface of the second shelf, a first set of fiber optic filaments having first ends and second ends, each of the first ends of the first set of fiber optic filaments being coupled to one of the first set of holes, a second set of fiber optic filaments having first ends and second ends, each of the first ends of the second set of fiber optic filaments being coupled to one of the second set of holes, a first holder configured to hold the second ends of the first set of fiber optic filaments, the first holder exposing terminal surfaces of the second ends of the first set of fiber optic filaments, a second holder configured to hold the second ends of the second set of fiber optic filaments the second holder exposing terminal surfaces of the second ends of the second set of fiber optic filaments, a shadow box including a plurality of openings, each of the plurality of openings being configured to receive a holder, a first camera within the shadow box, the first camera configured to capture an image of the terminal surfaces of the first set of fiber optic filaments and the terminal surfaces of the second set of fiber optic filaments, one or more processors communicatively coupled to the first camera, one or more memory components communicatively coupled to the one or more processors, and machine readable instructions stored in the one or more memory components that, when executed by the one or more processors, cause the fiber optic shelving system to: determine a number of products on the first shelf and a number of products on the second shelf based on the captured image of the terminal surfaces of the first set of fiber optic filaments and the terminal surfaces of the second set of fiber optic filaments.

In yet another embodiment, a fiber optic shelving system includes a shelf including a plurality of holes on a top surface of the shelf, a plurality of caps integrated in the plurality of holes, a plurality of fiber optic filaments, each of the plurality of fiber optic filaments having a first end and a second end, and the first end being detachably coupled to one of the plurality of caps, a holder configured to hold the second ends of the plurality of fiber optic filaments, the holder exposing terminal surfaces of the second ends of the plurality of fiber optic filaments, a first camera configured to capture an image of the terminal surfaces of the plurality of fiber optic filaments, one or more processors communicatively coupled to the first camera, one or more memory components communicatively coupled to the one or more processors, and machine readable instructions stored in the one or more memory components that, when executed by the one or more processors, cause the fiber optic shelving system to: determine a number of products on the shelf based on the captured image of the terminal surfaces of the plurality of fiber optic filaments.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5B depicts terminal surfaces of the plurality of fiber optic filaments coupled to the shelf according to one or more embodiments shown and described herein;

FIG. 5C depicts an image of the side of products on the shelf captured by a second camera according to one or more embodiments shown and described herein;

FIGS. 17A and 17B depict a product on a shelf and the number of holes blocked by the product according to one or more embodiments shown and described herein;

FIGS. 17C and 17D depict an object on a shelf and the number of holes blocked by the object according to one or more embodiments shown and described herein;

DETAILED DESCRIPTION

Referring generally to the figures, embodiments described herein are directed to fiber optic shelving system for determining the number of products on a shelf, i.e., inventory quantities and/or the locations of products on the shelf. A fiber optic shelving system includes a shelf including a plurality of holes on a top surface of the shelf, a plurality of fiber optic filaments, each of the plurality of fiber optic filaments having a first end and a second end, and the first end being coupled to one of the plurality of holes, a holder exposing terminal surfaces of the plurality of fiber optic filaments, a first camera configured to capture an image of the terminal surfaces of the second ends of the plurality of fiber optic filaments, and a second camera configured to capture an image of a side of one or more products on the shelf. The fiber optic shelving system determines the number of products on the shelf based on the captured image of the terminal surfaces of the second ends of the plurality of fiber optic filaments and the captured image of the side of one or more products on the shelf. Such systems allow stores to accurately determine inventory quantities in real time, check displayed orientation of products on store shelves, facilitate restocking of products by alerting low-in-stock or out-of-stock, determine products that are to be expired or decayed, and prevent theft activities. Embodiments of the systems for determining the number of products on a shelf using fiber optic filaments will be described in more detail herein with reference to the attached figures.

Figure 1:
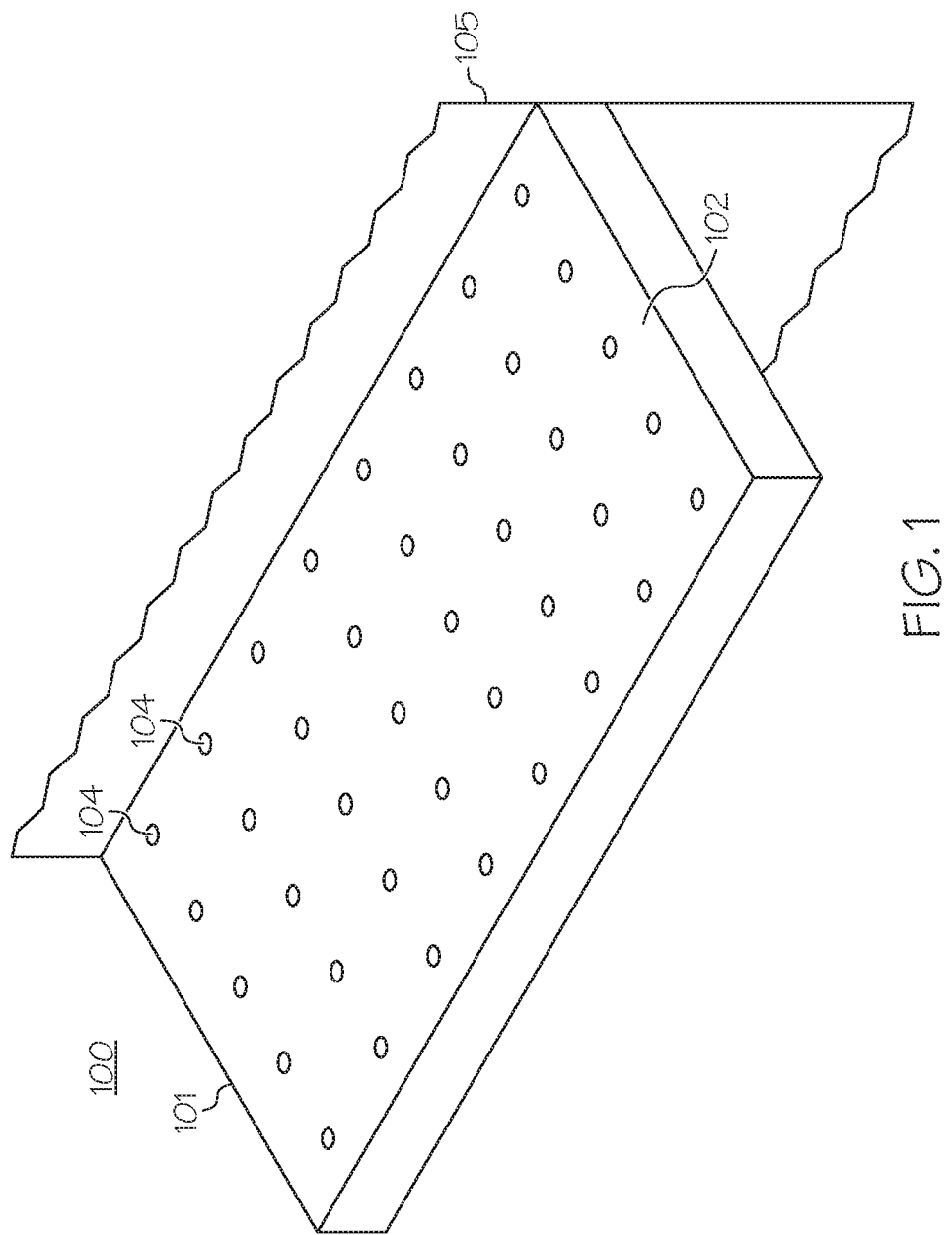
FIG. 1 schematically depicts a perspective view of a fiber optic shelving system according to one or more embodiments shown and described herein.

Referring to FIG. 1, a perspective view of a fiber optic shelving system 100 according to one or more embodiments is schematically depicted. The fiber optic shelving system 100 includes a shelf 101 that includes a top surface 102 where a plurality of holes 104 are located. The shelf 101 may be fixed to a wall 105. In embodiments, the shelf 101 is coupled perpendicularly to the wall 105. The plurality of holes 104 may be covered by a transparent material such that an ambient light can pass through the holes 104. In some embodiments, the plurality of holes 104 may be covered by a translucent material which may add color to the light passing through the plurality of holes 104.

Figure 2A:
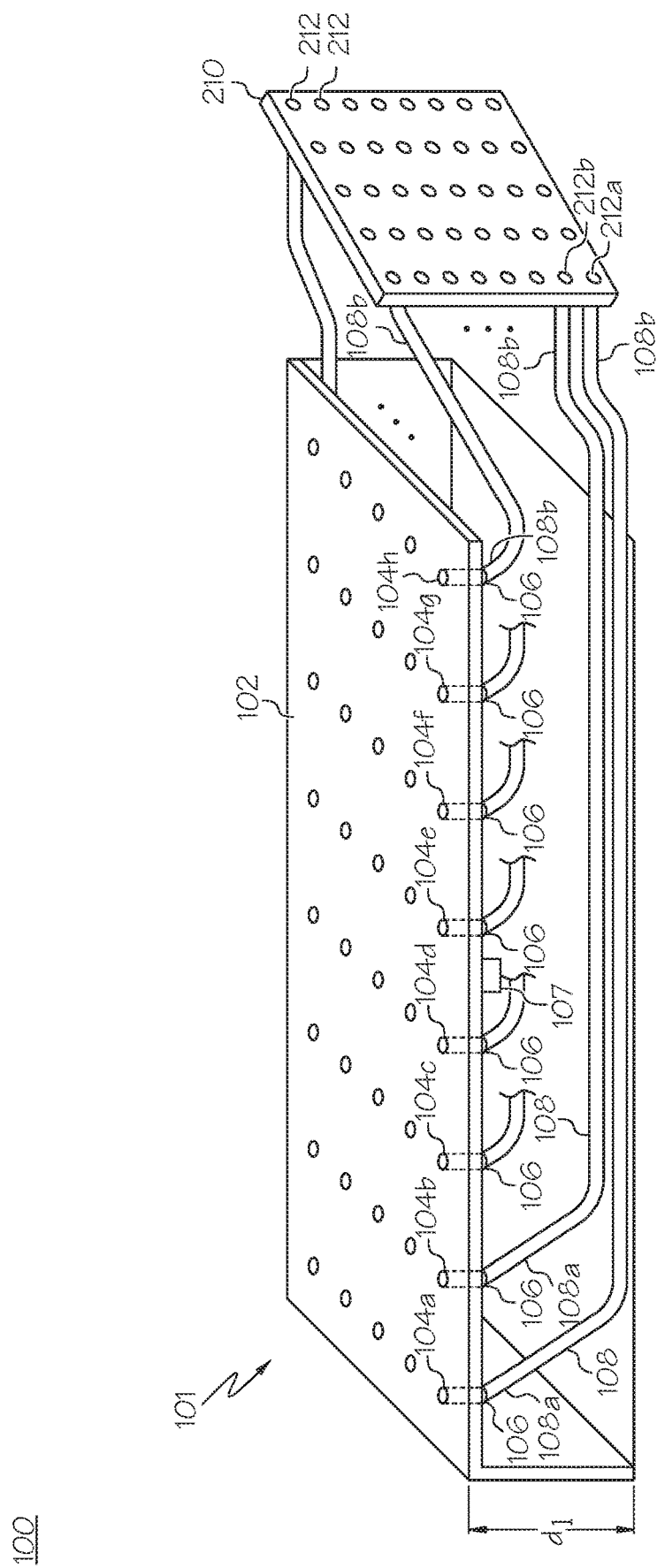
FIG. 2A schematically depicts a fiber optic shelving system including a plurality of fiber optic filaments, according to one or more embodiments shown and described herein.

FIG. 2A is a perspective view of a fiber optic shelving system 100 according to one or more embodiments. In FIG. 2A, the shelf 101 includes a plurality of caps 106 integrated in the plurality of holes 104, respectively. The shelf 101 may have a thickness of d1. The plurality of caps 106 may consist of light transmitting material. Detailed structure of the plurality of caps 106 will be described further with reference to FIG. 2B. A plurality of fiber optic filaments 108 are coupled to the plurality of caps 106. Specifically, a first end 108a of a fiber optic filament 108 may be detachably coupled to one of the plurality of caps 106 as shown in FIG.

2A. Each of the plurality of caps 106 is optically coupled to each of the fiber optic filaments 108.

Each of second ends 108b of the plurality of fiber optic filaments 108 is fixed to a holder 210 such that the holder 210 maintains an array of terminal surfaces 212 of fiber optic filaments. The terminal surfaces 212 of the fiber optic filaments 108 are optically connected to the plurality of holes 104. For example, a terminal surface 212a of the fiber optic filament 108 is optically connected to the hole 104a such that a light entering the hole 104a travels along the fiber optic filament 108 and illuminates the terminal surface 212a of the fiber optic filament 108. Thus, when ambient light enters the hole 104a, the terminal surface 212a illuminates. Similarly, a terminal surface 212b of the fiber optic filament 108 is optically connected to the hole 104b, such that a light entering the hole 104b travels along the fiber optic filament 108 and illuminates the terminal surface 212b of the fiber optic filament. Thus, when ambient light enters the hole 104b, the terminal surface 212b illuminates. In contrast, when the hole 104a is blocked by a non-transparent object on the top surface 102 of the shelf 101, the terminal surface 212a does not illuminate.

In another embodiment, the fiber optic filaments 108 may be directly coupled to the plurality of holes 104 without any intervening caps 106. In some embodiment, a plurality of caps similar to the plurality of caps 106 of the shelf 101 may be integrated in the holder 210, and the second ends 108b of the plurality of fiber optic filaments 108 are detachably coupled to the caps integrated in the holder 210. The holder 210 may expose terminal surfaces of the plurality of caps that are coupled to the fiber optic filaments 108.

In some embodiments, the shelf 101 may include a weight sensor 107 to detect the weight of objects placed on the top surface 102. The weight sensor 107 transmits weight information about products on the shelf 101 to a store computing system, which will be described below with reference to FIG. 10.

Figure 2B:
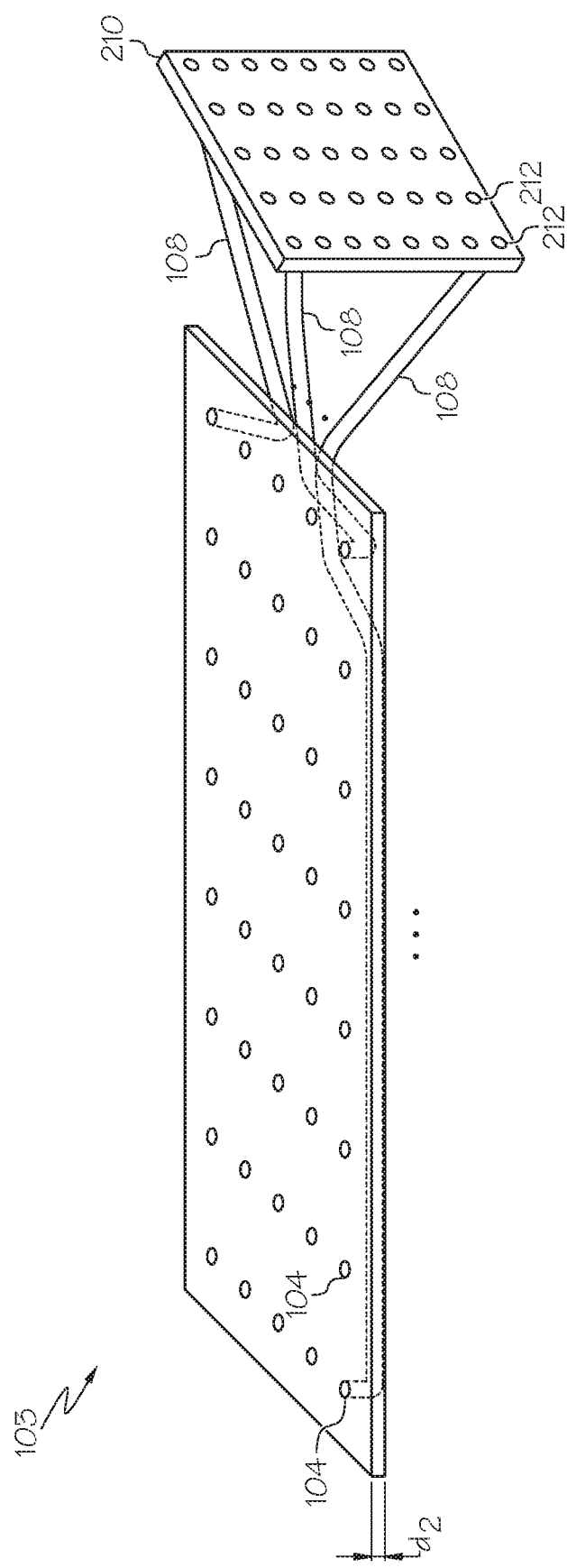
FIG. 2B schematically depicts a fiber optic shelving system including a plurality of fiber optic filaments, according to one or more embodiments shown and described herein.

FIG. 2B is a perspective view of a fiber optic shelving system 100 according to another embodiment. In FIG. 2B, a mat 103 is used in the fiber optic shelving system 100. The thickness d2 of the mat 103 is smaller than the thickness d1 of the shelf 101. The mat 103 may be a flexible mat, such as a PVC mat, or made from other materials. Similar to the shelf 101 in FIG. 2A, the mat 103 includes a plurality of holes 104. The mat 103 includes a plurality of caps 106 integrated in the plurality of holes 104, respectively. The plurality of fiber optic filaments 108 are embedded within the mat 103 and exposed at one side of the mat 103. The plurality of fiber optic filaments 108 are coupled to the plurality of caps 106. Specifically, a first end 108a of a fiber optic filament 108 is detachably coupled to one of the plurality of caps 106 as shown in FIG. 2A. Each of the plurality of caps 106 is optically coupled to each of the fiber optic filaments 108. Each of second ends 108b of the plurality of fiber optic filaments 108 is fixed to the holder 210, and the holder 210 exposes an array of terminal surfaces 212 of the plurality of fiber optic filaments 108. The terminal surfaces 212 of the plurality of fiber optic filaments 108 are optically connected to the plurality of holes 104. Thus, when ambient light enters the holes 104, the terminal surfaces 212 illuminate. In contrast, when the holes 104 are blocked by a non-transparent object on the top surface 102, the terminal surfaces 212 do not illuminate. In another embodiment, the fiber optic filaments 108 may be directly coupled to the plurality of holes 104 without any intervening caps 106.

Figure 3B:
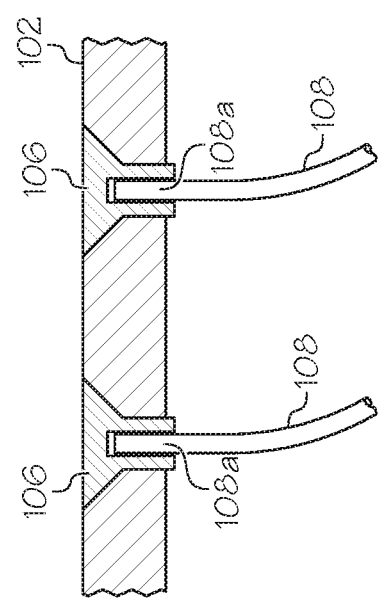
FIG. 3B schematically depicts a plurality of caps integrated in a shelf according to one or more embodiments shown and described herein.
Figure 3A:
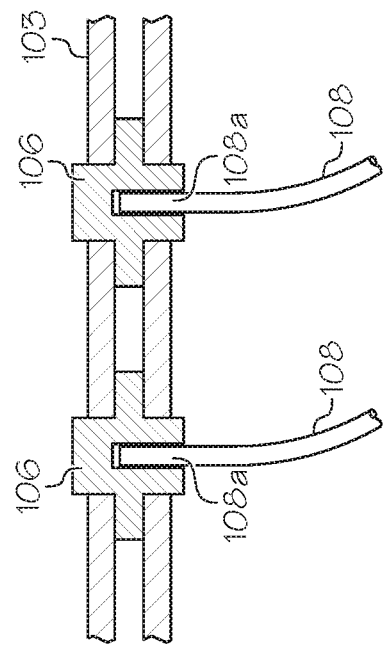
FIG. 3A schematically depicts a plurality of caps integrated in a shelf according to one or more embodiments shown and described herein.

FIGS. 3A and 3B depict structure of the plurality of caps 106 according to one or more embodiments. In FIG. 3A, the plurality of caps 106 are integrated in the shelf 101. Each of the fiber optic filaments 108 is detachably coupled to each of the plurality of caps 106. In embodiments, the plurality of caps 106 are cone-shaped such that light entering the caps 106 may converge on the fiber optic filaments 108. In some embodiments, the plurality of caps 106 are integrated between two layers of the mat 103 as shown in FIG. 3B. An additional layer (not shown in FIG. 3B) of the mat 103 may constitute the bottom of the mat 103 such that the fiber optic filaments 108 are embedded within the mat 103. Each of the fiber optic filaments 108 is detachably coupled to each of the plurality of caps 106. The structure of the caps 106 are not limited to ones described in FIGS. 3A and 3B, and may be in a different shape, for example, a cylindrical shape, a rectangular parallelepiped, etc. In some embodiments, the mat 103 may be a single plate holding the plurality of caps 106, and the plurality of fiber optic filaments 108 may be embedded within the mat 103.

Figure 4:
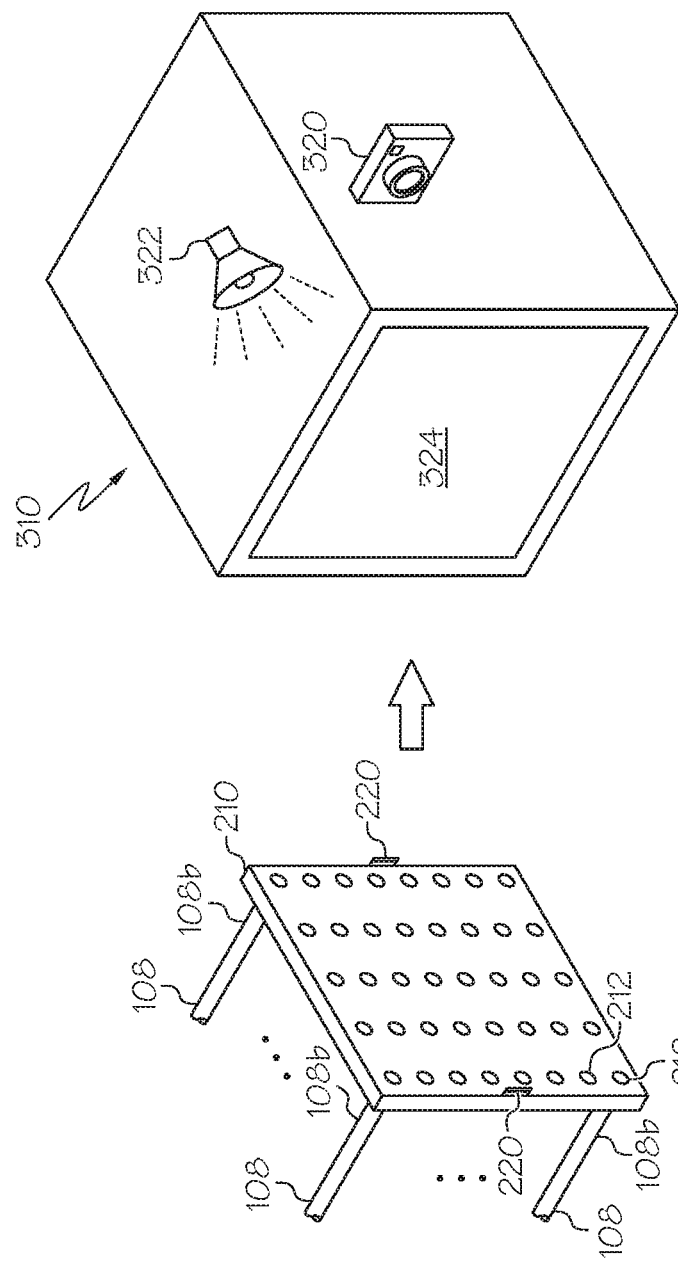
FIG. 4 schematically depicts coupling a holder to a shadow box according to one or more embodiments shown and described herein.

FIG. 4 depicts coupling the holder 210 to a shadow box 310 according to one or more embodiments shown and described herein. As described with reference to FIG. 2, each of the second ends 108b of the plurality of fiber optic filaments 108 is fixed to the holder 210, and the holder 210 exposes the terminal surfaces 212 of the fiber optic filament 108. The holder 210 may be inserted into an opening 324 of the shadow box 310. The holder 210 includes retention mechanisms 220 that securely fix the holder 210 into the opening 324 of the shadow box 310. A camera 320 is inside the shadow box 310 and configured to capture an image of the array of the terminal surfaces 212 of the plurality of fiber optic filaments 108. The shadow box 310 may be made of materials that block outer lighting from entering the shadow box 310 except for light from the plurality of fiber optic filaments 108, such that the camera 320 can accurately captures light from the terminal surfaces 212. The image captured by the camera 320 may be transmitted to a store computing system, which will be described below with reference to FIG. 10. In some embodiments, the camera 320 may process the captured image to obtain data (e.g., pixel values), and transmit the data to the store computing system. In some embodiments, the camera 320 captures visual characteristics (e.g., optical intensity, color spectrum, light density) of the terminal surfaces 212 of the plurality of fiber optic filaments 108. The visual characteristic may be transmitted to the store computing system which may determine whether a product on the shelf 101 is expired or decayed based on the visual characteristic. For example, the color array projected from the product may be used to determine whether the product is expired or decayed.

In embodiments, the shadow box 310 includes a lighting source 322 that directs light towards the holder 210. The lighting source 322 may be any lighting source e.g., an LED, fluorescent, laser, etc. The lighting source 322 may emit various colors of light. The light from the lighting source 322 enters the terminal surfaces 212, travels through the fiber optic filaments 108, and illuminates the plurality of holes 104. The lighting source 322 may be communicatively coupled to the store computing system, and receive an instruction for lighting up the terminal surfaces 212 from the computing system, the details of which will be described below with reference to FIG. 10. The lighting source 322 may project light into multiple holders, or may be movable to target certain holders. In some embodiments, the shadow box 310 may include a plurality of lighting sources. Each of the plurality of lighting sources may direct light to one of the plurality of holders.

Figure 5A:
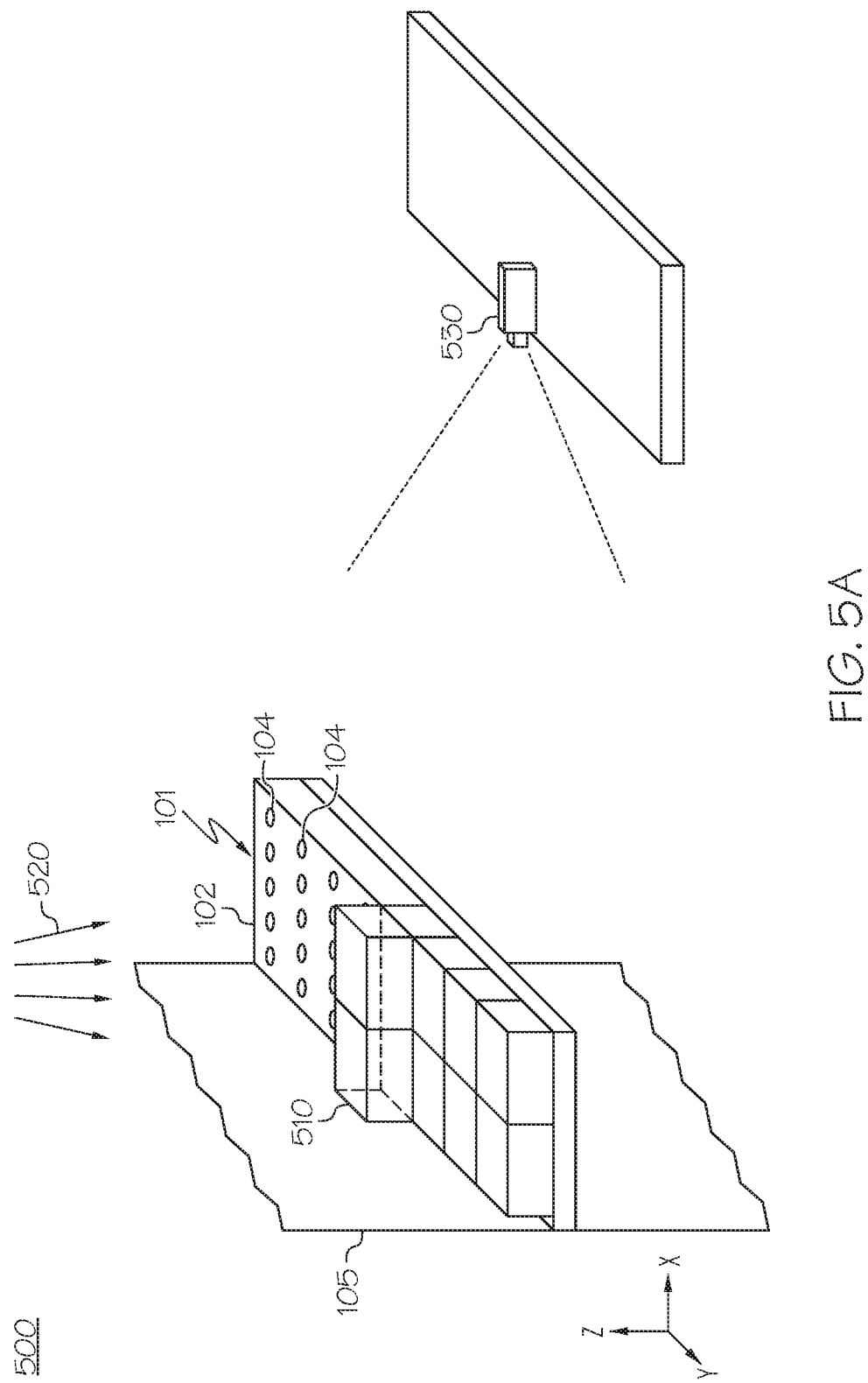
FIG. 5A schematically depicts a fiber optic shelving system and a second camera according to one or more embodiments shown and described herein.

FIG. 5A depicts a fiber optic shelving system 500 according to one or more embodiments. The fiber optic shelving system 500 includes the shelf 101 and a second camera 530. The shelf 101 is fixed to the wall 105. As described with reference to FIG. 2A, the shelf 101 includes the plurality of holes 104 on its top surface 102, and the plurality of fiber optic filaments 108 (not shown in FIG. 5A) that are coupled to the shadow box 310 (not shown in FIG. 5A). The second camera 530 may be located across the shelf 101 (e.g., located at +x side of the shelf 101) and pointed at the shelf 101 (e.g., pointing −x direction). The camera 530 may capture a side of one or more products 510 on the shelf 101 (i.e., an image of y-z plane). The one or more products 510 are placed on the top surface 102 of the shelf 101. Ambient light 520, such as store lights, illuminates the holes 104 of the shelf 101. For example, the ambient light 520 enters some of the holes 104 of the shelf in −z direction, travels through the fiber optic filaments 108, and reaches the shadow box 310. Other holes 104 of the shelf 101 are blocked by the products 510, so that the ambient light 520 cannot path through the blocked holes 104.

FIG. 5B illustrates an array of terminal surfaces 212 of the fiber optic filaments 108 optically connected to the plurality of holes 104 of the shelf 101 in FIG. 5A. A first set 222 of the terminal surfaces 212 are illuminated by the ambient light 520. In contrast, a second set 224 of the terminal surfaces 212 are dark because corresponding holes 104 are blocked by the products 510. The camera 320 in the shadow box 310 may capture the array of terminal surfaces 212 and send the captured image to the store computing system for determining inventory quantities on the shelf 101. FIG. 5C illustrates an image captured by the second camera 530. The image includes a side of five products 510 on the shelf 101. The image captured by the second camera 530 may be also transmitted to the store computing system for determining the number of products 510 on the shelf 101.

Figure 6:
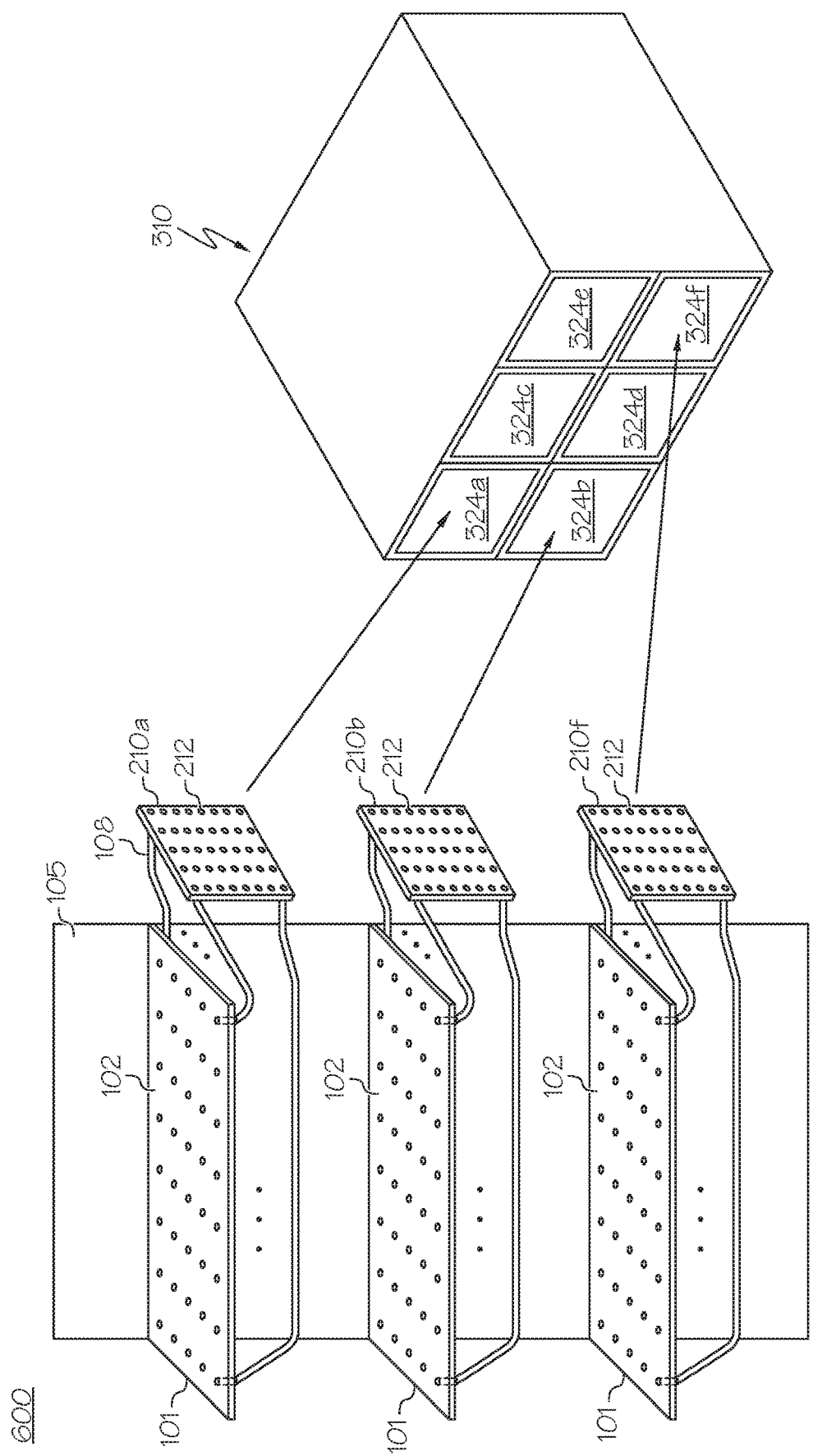
FIG. 6 depicts a fiber optic shelving system according to one or more embodiments shown and described herein.

FIG. 6 is a perspective view of a fiber optic shelving system 600 according to another embodiment. The fiber optic shelving system 600 includes a plurality of shelves 101. The plurality of shelves 101 are coupled to the wall 105. Each of the plurality of shelves 101 includes the plurality of holes 104 on its top surface 102. As described with reference to FIG. 2A above, for each of the plurality of shelves 101, the first ends of the plurality of fiber optic filaments 108 are optically coupled to the plurality of caps 106 integrated in the top surface 102, and the second ends of the plurality of fiber optic filaments 108 are fixed by the holders, for example, holders 210a, 210b, and 210f. The holders 210a, 210b, and 210f expose terminal surfaces 212 of the collected fiber optic filaments 108. The shadow box 310 includes a plurality of openings 324a, 324b, 324c, 324d, 324e, and 324f. Each of the openings 324a, 324b, 324c, 324d, 324e, and 324f may receive one of the holders. For example, the holder 210a, 210b, and 210f may be inserted to the openings 324a, 324b, and 324f. The shadow box 310 includes the camera 320 inside. The camera 320 may capture an image of arrays of the terminal surfaces 212 of the holders 210a, 210b, and 210f at the same time. Thus, the captured image includes inventory information about more than one shelves. Although FIG. 6 illustrates that the shadow box 310 includes six openings, the number of openings is not limited thereto.

Figure 7:
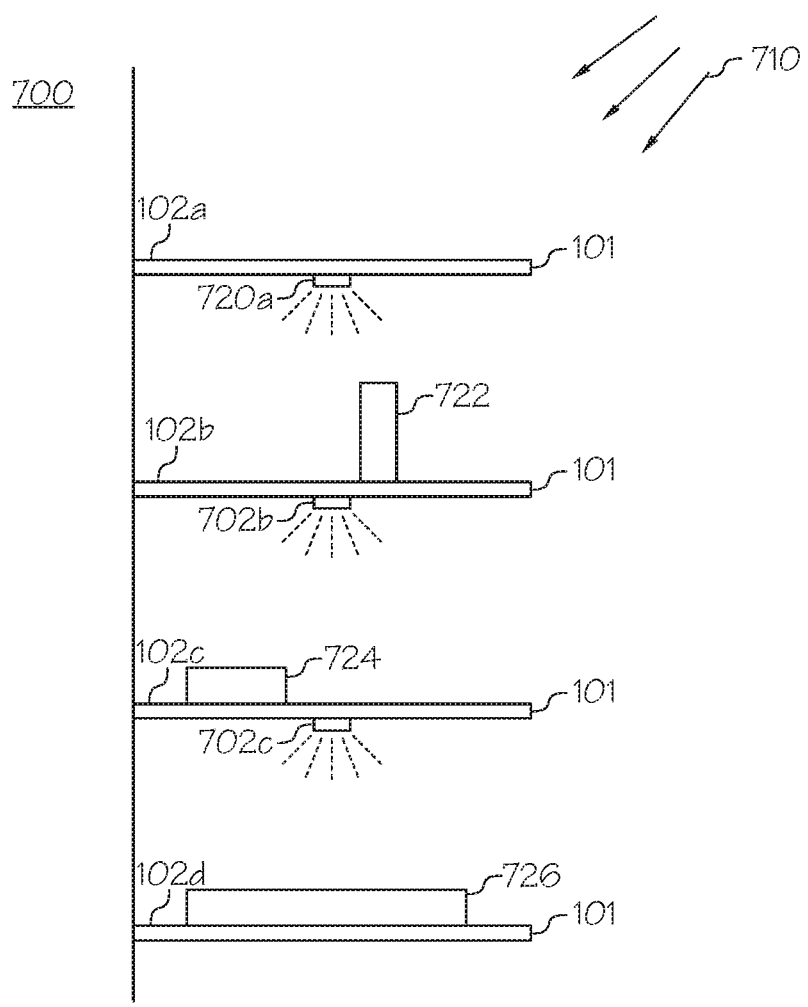
FIG. 7 depicts a fiber optic shelving system including lighting sources according to one or more embodiments shown and described herein.

FIG. 7 depicts a fiber optic shelving system 700 according to one or more embodiments. The fiber optic shelving system 700 includes a plurality of shelves 101. The plurality of shelves 101 are coupled to the wall 105. Each of the plurality of shelves 101 includes the plurality of holes 104 on its top surface 102a, 102b, 102c, or 102d. Ambient light 710, such as store lights, illuminates the holes 104 of the plurality of shelves 101. However, the ambient light 710 may not uniformly illuminate each of the plurality of shelves 101 due to obstacles, difference in distance from the light source, etc. In this embodiment, the shelves 101 include lighting sources 720a, 720b, and 720c at the bottom of the shelves 101. Each of the lighting sources 720a, 720b, and 720c illuminates the top surface of the shelf 101 below each of the lighting sources 720a, 720b, and 720c. For example, the lighting source 720a illuminates the top surface 102b and the product 722, the lighting source 720b illuminates the top surface 102c and the product 724, and the lighting source 720c illuminates the top surface 102d and the product 726. The intensity of light that reaches the top surfaces 102b, 102c, and 102d may be substantially the same because the lumen of the lighting sources 720a, 720b, and 720c are substantially the same.

Figure 8:
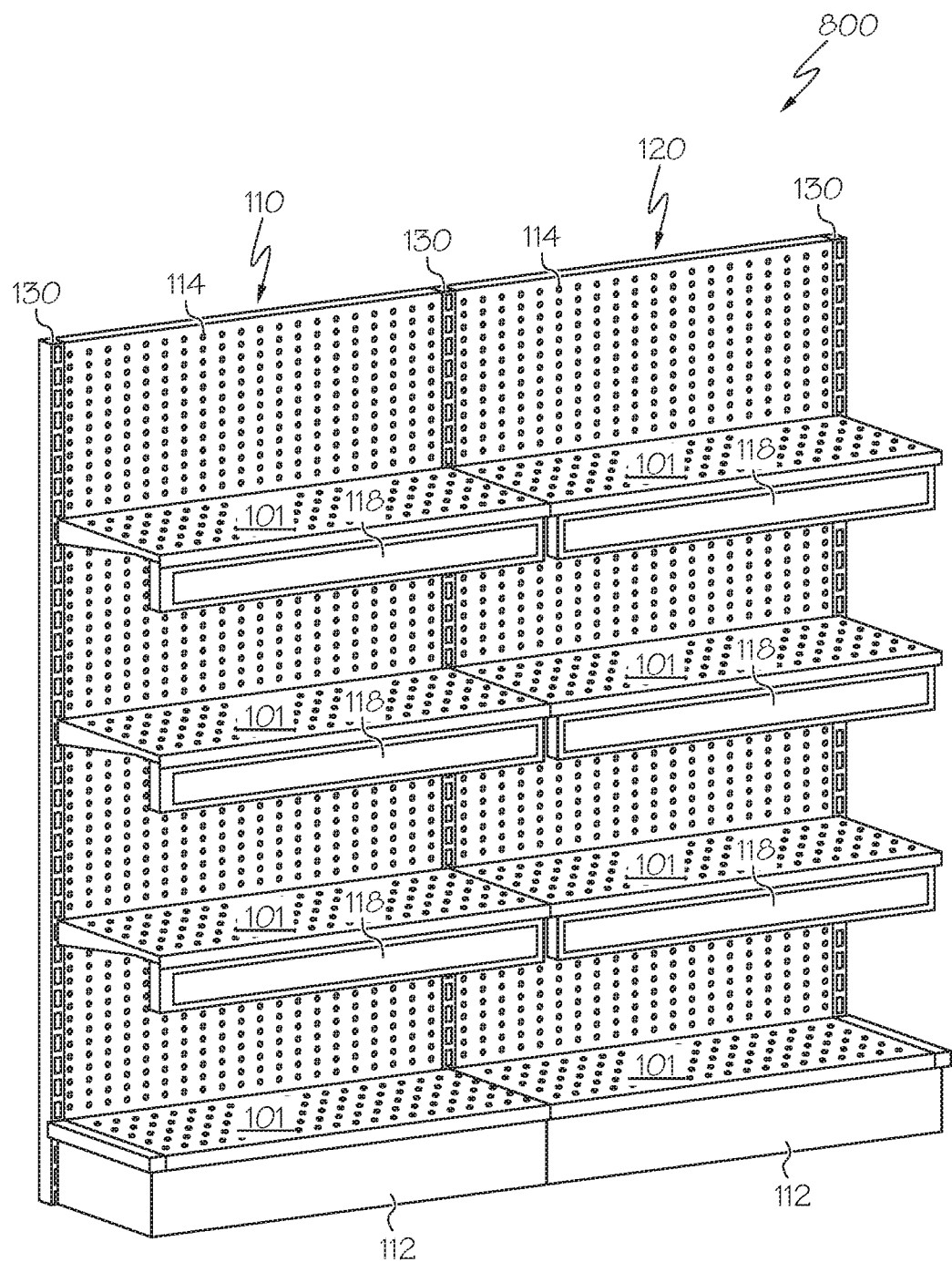
FIG. 8 depicts a perspective view of a fiber optic shelving system including a plurality of display units, according to one or more embodiments shown and described herein.

Referring now to FIG. 8, a perspective view of a modular shelving system 800 including a first shelving module 110, a second shelving module 120, and a plurality of interfacing uprights 130 is schematically depicted. Each of the first shelving module 110 and the second shelving module 120 includes a base 112, a back plane 114, a plurality of shelves 101, and a plurality of display units 118. Each of the plurality of shelves 101 includes the plurality of holes 104 as described with reference to FIG. 1. The back plane 114 is generally planar and extends substantially perpendicularly from the base 112. The plurality of shelves 101 are secured to the plurality of interfacing uprights 130, each of which includes a plurality of apertures through which corresponding projections of the plurality of shelves 101 may be inserted to mount the plurality of shelves 101 to the shelving modules. The plurality of shelves 101 extend substantially perpendicularly from the back plane 114 in a direction that is substantially parallel to the base 112. The assembly of the shelving modules and the interfacing uprights 130 support the plurality of shelves 101 on which products may be placed. The plurality of display units 118 extend beneath the plurality of shelves 101 and are operable to display information to a person near the shelving modules, such as information pertaining to products on the plurality of shelves 101, information useful to stock products on the plurality of shelves 101, information useful to retrieve products from the plurality of shelves 101, and a variety of additional information, as will be described in detail below.

Still referring to FIG. 8, in some embodiments, each of the plurality of display units 118 is powered by an Ethernet connection or through the back plane 114, as described in U.S. patent application Ser. No. 13/734,443, entitled "DISPLAY SHELF MODULES WITH PROJECTORS FOR DISPLAYING PRODUCT INFORMATION AND MODULAR SHELVING SYSTEMS COMPRISING THE SAME," the entirety of which is incorporated by reference herein. In other embodiments, each of the plurality of display units 118 is powered by a power distribution system. In some embodiments, the plurality of display units 118 is powered in another manner, such as via batteries, or the like.

Still referring to FIG. 8, in some embodiments, each of the plurality of display units 118 includes a projector unit and a display screen, as described in U.S. patent application Ser. No. 13/734,443, entitled "DISPLAY SHELF MODULES WITH PROJECTORS FOR DISPLAYING PRODUCT INFORMATION AND MODULAR SHELVING SYS- TEMS COMPRISING THE SAME," the entirety of which is incorporated by reference herein. In other embodiments, one or more of the plurality of display units 118 includes a powered display screen, such as a TFT screen, an LCD screen, or the like. In some embodiments, the modular shelving system 800 may include one or more additional input or output components, such as a microphone (e.g., for receiving voice input from a consumer), a camera, a barcode reader, a speaker, or the like.

Figure 9:
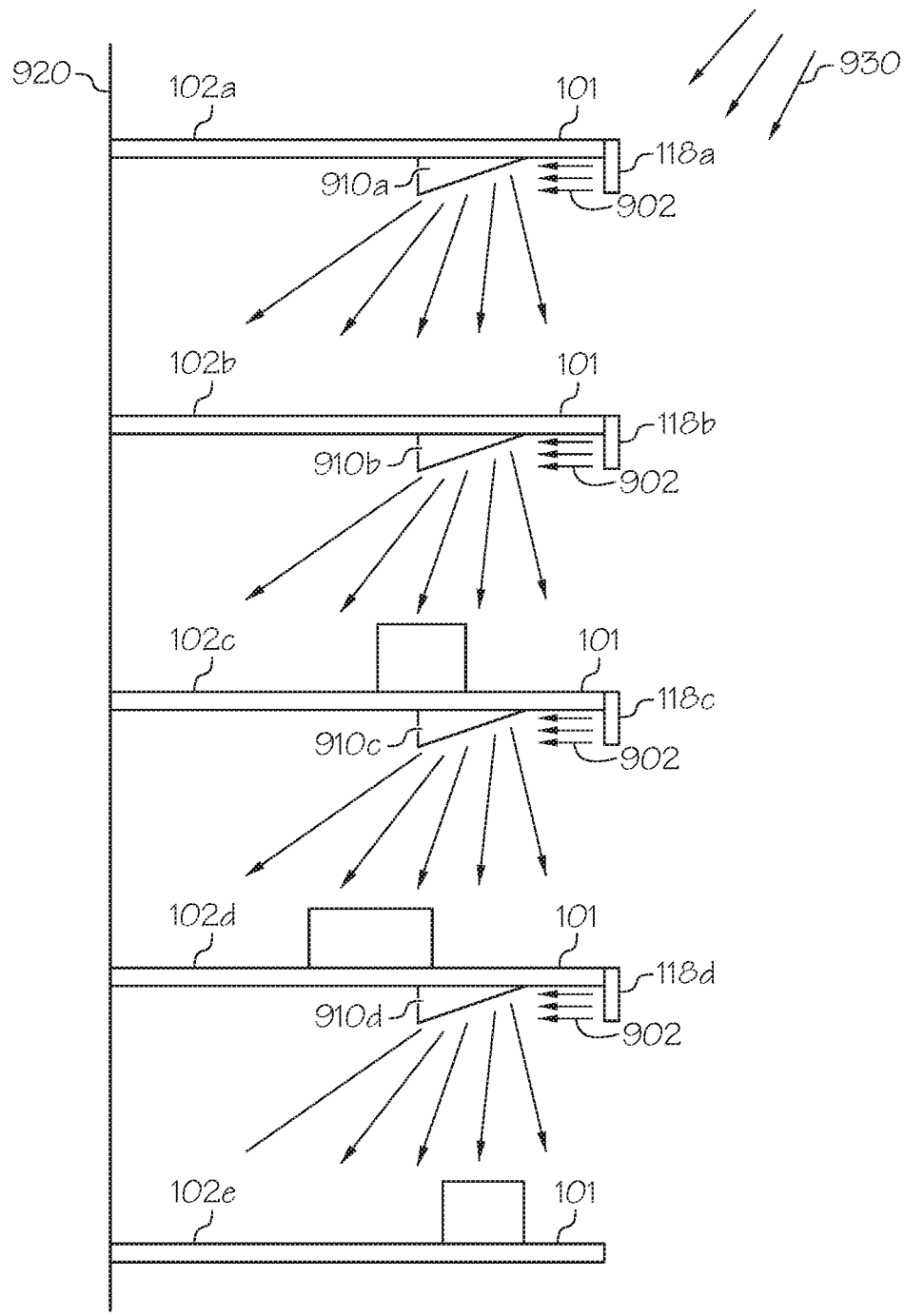
FIG. 9 depicts a fiber optic shelving system including a plurality of display units according to one or more embodiments shown and described herein.

FIG. 9 depicts a fiber optic shelving system 900 according to one or more embodiments. The fiber optic shelving system 900 includes a plurality of shelves 101. The plurality of shelves 101 are coupled to a shelving module 920. Each of the plurality of shelves 101 includes a plurality of holes 104 on its top surface 102a, 102b, 102c, 102d, or 102e. Ambient light 930, such as store light, illuminates the holes 104 of the plurality of shelves 101. However, ambient light 930 may not uniformly illuminate each of the plurality of shelves 101 due to obstacles, difference in distance from the light source, etc.

In this embodiment, the plurality of display units 118a, 118b, 118c, and 118d direct light towards (−) x direction. The shelves 101 include optic elements 910a, 910b, 910c, 910d at the bottom of the shelves 101. The optic elements 910a, 910b, 910c, and 910d may be light reflecting elements, e.g., mirrors, which directs light 902 emitting from the plurality of display units 118a, 118b, 118c, and 118d toward the top surfaces 102b, 102c, 102d, and 102e, such that the top surfaces 102b, 102c, 102d, and 102e are substantially uniformly illuminated by the light 902. In other embodiments, the shelves 101 do not include optic elements 910a, 910b, 910c, and 910d at the bottom of the shelves 101, and the plurality of display units 118a, 118b, 118c, and 118d direct lights in a direction toward the top surfaces 102b, 102c, 102d, and 102e, respectively.

Figure 10:
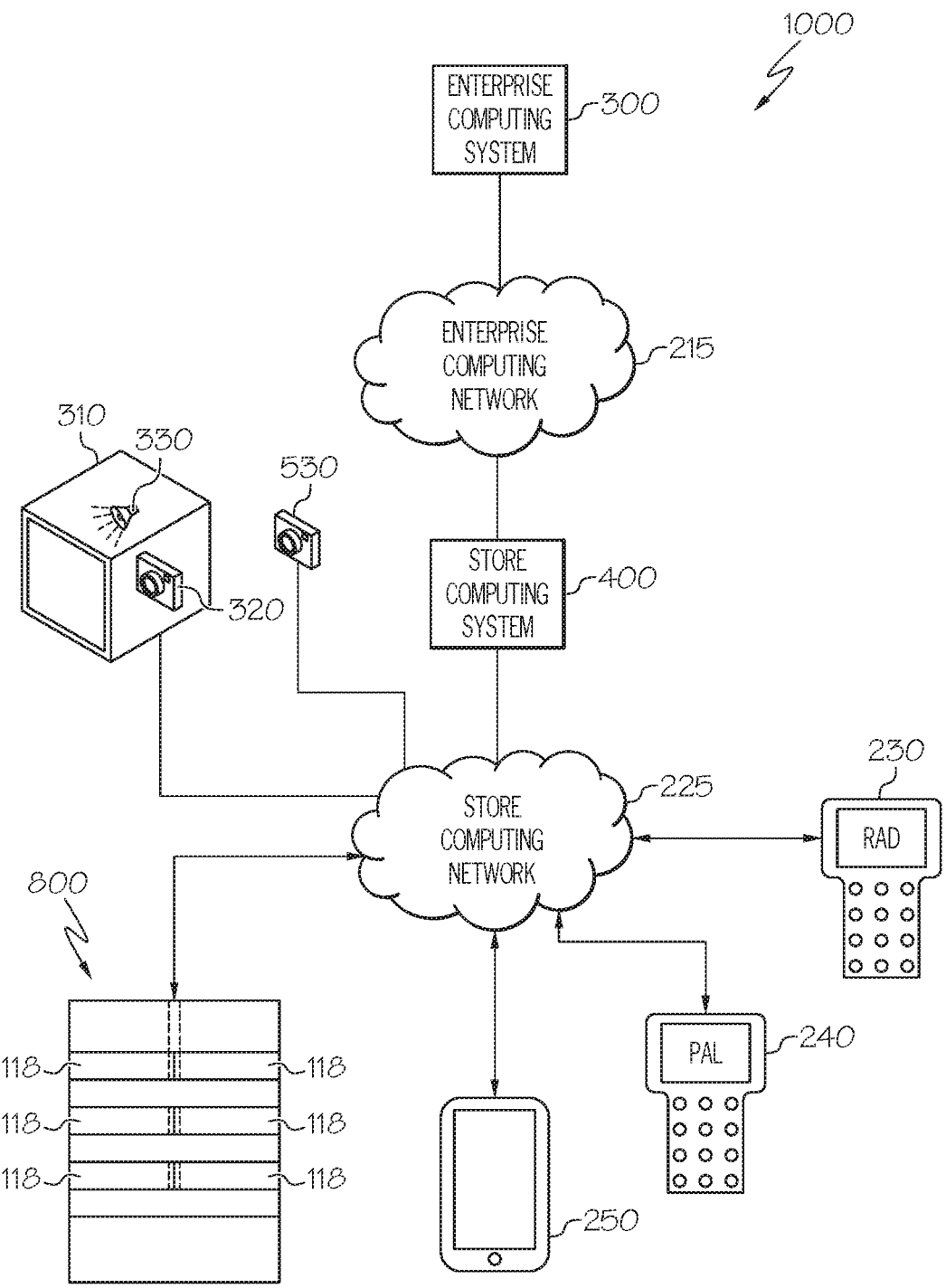
FIG. 10 schematically depicts a computing network for controlling a shadow box, a second camera, and shelf display units according to one or more embodiments shown and described herein.

Referring now to FIG. 10, one embodiment of a computing network 1000 for controlling the shadow box 310 and for determining inventory quantities on shelves is schematically depicted. In this embodiment, the computing network 1000 includes an enterprise computing system 300, an enterprise computing network 215, a store computing system 400, a store computing network 225, a retail associate device 230, a personal assistant and liaison device 240, a mobile computing device 250, the plurality of display units 118, the shadow box 310, and the second camera 530.

Still referring to FIG. 10, the computing network 1000 includes the enterprise computing network 215 for communicatively coupling the enterprise computing system 300 and the store computing system 400 such that data can be exchanged between the enterprise computing system 300 and the store computing system 400. The enterprise computing network 215 may include one or more computer networks (e.g., a wide area network, a personal area network, or a local area network), one or more cellular networks, one or more satellite networks, or combinations thereof. Accordingly, each of the enterprise computing system 300 and the store computing system 400 may be communicatively coupled to the enterprise computing network 215 via a wide area network, via a local area network, via a personal area network, via a cellular network, via a satellite network, or the like. Suitable wide area networks may include wired or wireless telecommunications networks that transmit information via coaxial cables, fiber-optic cables, radio-frequency transmission, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 10, the enterprise computing network 215 communicatively couples the enterprise computing system 300 and the store computing system 400 such that data may be exchanged between the systems. In some embodiments, the enterprise computing system 300 stores enterprise data and interacts with a plurality of store computing systems associated with a plurality of stores. For example, the enterprise computing system 300 may be a central computing system operated by an owner of a grocery store chain or other retailer that owns a plurality of stores for selling products. Each of the plurality of store computing systems may be associated with a store affiliated with, owned, or operated by the grocery store chain or other retailer. Each of the plurality of store computing systems may receive information from the enterprise computing system 300 and use the received data, along with other data input to the store computing system 400 by devices located at the store, to interface with and interact with any number of electronic components (e.g., shadow boxes, cameras, point of sale devices, shelf displays, lighting systems, retail associate devices, personal assistant and liaison devices, etc.) at the store.

Still referring to FIG. 10, the enterprise computing system 300 stores enterprise data for distribution to a plurality of store computing systems, such as the store computing system 400. For example, the enterprise computing system 300 may store inventory quantities pertaining to products on the shelves, product data pertaining to products to be sold at one or more store locations, pricing data pertaining to the products to be sold at the one or more store locations, planogram data pertaining to the placement of products on shelves, label data to be displayed on shelf display units at the one or more store locations, multimedia content (e.g., pictures, video, sound, or the like), and the like. The enterprise computing system 300 may facilitate the interaction with and control of the shadow boxes 310, the second cameras 530, and the plurality of display units 118 of the modular shelving system, as will be described below. Further components and functionality of the enterprise computing system 300 will be described with reference to FIG. 12 below.

Still referring to FIG. 10, the store computing system 400 may receive information from the enterprise computing system 300 and use the received data, along with other data input to the store computing system 400 by devices located at the store, to interface with and interact with any number of electronic components (e.g., cameras, point of sale devices, shelf displays, lighting systems, retail associate devices, personal assistant and liaison devices, etc.) at the store. The store computing system 400 may also facilitate the interaction with and control of the shelves 101 and the plurality of display units 118 of the modular shelving system, as will be described below. Further components and functionality of the store computing system 400 will be described with reference to FIG. 13 below.

Still referring to FIG. 10, each of the enterprise computing system 300 and the store computing system 400 may be implemented as one or more computing devices, such as but not limited to server computers, personal computers, mobile computing devices, and the like. Furthermore, while each of the enterprise computing system 300 and the store computing system 400 are depicted in FIG. 10 as a single piece of hardware, embodiments are not so limited. For example, in some embodiments, the enterprise computing system 300, the store computing system 400, or both the enterprise computing system 300 and the store computing system 400 may be implemented as a plurality of computing devices interconnected by a network.

Still referring to FIG. 10, the computing network 1000 includes the store computing network 225 for communicatively coupling the store computing system 400 to the retail associate device 230, the personal assistant and liaison device 240, the mobile computing device 250, and the plurality of display units 118, such that data can be exchanged between the components. The store computing network 225 may include one or more computer networks (e.g., a wide area network, a personal area network, or a local area network), one or more cellular networks, one or more satellite networks, or combinations thereof. Accordingly, each of the retail associate device 230, the personal assistant and liaison device 240, the mobile computing device 250, the shadow box 310, the second camera 530, and the plurality of display units 118 may be communicatively coupled to the store computing network 225 via a wide area network, via a local area network, via a personal area network, via a cellular network, via a satellite network, or the like. Suitable wide area networks may include wired or wireless telecommunications networks that transmit information via coaxial cables, fiber-optic cables, radio-frequency transmission, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 10, the store computing network 225 communicatively couples the store computing system 400, the retail associate device 230, the personal assistant and liaison device 240, the mobile computing device 250, the shadow box 310, the second camera 530, and the plurality of display units 118 such that data may be exchanged between the components of the network. The store computing system 400 may receive data from and provide data to the retail associate device 230, the personal assistant and liaison device 240, the mobile computing device 250, the shadow box 310, the second camera 530, and the plurality of display units 118.

Still referring to FIG. 10, in embodiments, the retail associate device 230 is a mobile computing device that may be used by a retail associate at a store to assist in the performance of a variety of functions, such as restocking shelves, resetting planograms, scanning product SKUs, retrieving products ordered by customers, and the like. The retail associate device 230 is a computing device that includes a processor, a data storage component, a non-transitory memory component, input/output hardware, network interface hardware, and a local interface. The processor of the retail associate device 230 includes a processing component configured to receive and execute instructions from the data storage component of the memory component. The memory component of the retail associate device 230 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. The data storage device or the memory component may be configured to store logic that causes the retail associate device 230 to perform the functions described herein when executed by the processor. The input/output hardware of the retail associate device 230 may include a display device (e.g., a touch screen, LCD screen, plasma screen, TFT screen, or the like), a tactile input device (e.g., a keypad, button, keyboard, mouse, or the like), a camera, a barcode reader, a microphone, a speaker, or the like, for receiving, sending, and/or presenting data. The network interface hardware of the retail associate device 230 may include any wired or wireless networking hardware, such as a modem, LAN port, wireless fidelity (Wi-Fi) card, WiMax card, mobile communications hardware, and/or other hardware for communicating with the store computing network 225 or with other devices. The local interface of the retail associate device 230 may be implemented as a bus or other interface to facilitate communication among the components of the retail associate device 230. While FIG. 10 only depicts a single retail associate device 230, some embodiments may include a plurality of retail associate devices, each of which may be carried and used by a different retail associate.

Still referring to FIG. 10, the personal assistant and liaison device 240 is a mobile computing device that may be used by a shopper at a store to perform a variety of functions, such as to scan and pay for products, to access shopping lists, or the like. The personal assistant and liaison device 240 is a computing device that includes a processor, a data storage component, a non-transitory memory component, input/output hardware, network interface hardware, and a local interface. The processor of the personal assistant and liaison device 240 includes a processing component configured to receive and execute instructions from the data storage component of the memory component. The memory component of the personal assistant and liaison device 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. The data storage device or the memory component may be configured to store logic that causes the personal assistant and liaison device 240 to perform the functions described herein when executed by the processor. The input/output hardware of the personal assistant and liaison device 240 may include a display device (e.g., a touch screen, LCD screen, plasma screen, TFT screen, or the like), a tactile input device (e.g., a keypad, button, keyboard, mouse, or the like), a camera, a barcode reader, a microphone, a speaker, or the like, for receiving, sending, and/or presenting data. The network interface hardware of the personal assistant and liaison device 240 may include any wired or wireless networking hardware, such as a modem, LAN port, wireless fidelity (Wi-Fi) card, WiMax card, mobile communications hardware, and/or other hardware for communicating with the store computing network 225 or with other devices. The local interface of the personal assistant and liaison device 240 may be implemented as a bus or other interface to facilitate communication among the components of the personal assistant and liaison device 240. While FIG. 10 only depicts a single personal assistant and liaison device 240, some embodiments may include a plurality of personal assistant and liaison devices, each of which may be carried and used by a different customer.

Still referring to FIG. 10, the mobile computing device 250 may be a mobile phone, a smartphone, a tablet, a personal digital assistant, a dedicated mobile media player, a mobile personal computer, a laptop computer, and/or any other mobile device including computing components. In some embodiments, the mobile computing device 250 may be used by a retail associate (e.g., when a retail associate uses the mobile computing device 250 to perform associate functions instead of the retail associate device 230). In some embodiments, the mobile computing device 250 may be used by a customer (e.g., when a customer uses the mobile computing device 250 instead of the personal assistant and liaison device 240 while shopping). In some embodiments, the mobile computing device 250 may be used by a retail associate or customer in addition to the retail associate device 230 or the personal assistant and liaison device 240. The mobile computing device 250 is a computing device that includes a processor, a data storage component, a non-transitory memory component, input/output hardware, network interface hardware, and a local interface. The processor of the mobile computing device 250 includes a processing component configured to receive and execute instructions from the data storage component of the memory component. The memory component of the mobile computing device 250 may be configured as volatile and/or non-volatile computer readable medium and, as such, may include random access memory (including SRAM, DRAM, and/or other types of random access memory), flash memory, registers, compact discs (CD), digital versatile discs (DVD), and/or other types of storage components. The data storage device or the memory component may be configured to store logic that causes the mobile computing device 250 to perform the functions described herein when executed by the processor. The input/output hardware of the mobile computing device 250 may include a display device (e.g., a touch screen, LCD screen, plasma screen, TFT screen, or the like), a tactile input device (e.g., a keypad, button, keyboard, mouse, or the like), a camera, a barcode reader, a microphone, a speaker, or the like, for receiving, sending, and/or presenting data. The network interface hardware of the mobile computing device 250 may include any wired or wireless networking hardware, such as a modem, LAN port, wireless fidelity (Wi-Fi) card, WiMax card, mobile communications hardware, and/or other hardware for communicating with the store computing network 225 or with other devices. The local interface of the mobile computing device 250 may be implemented as a bus or other interface to facilitate communication among the components of the mobile computing device 250. While FIG. 10 only depicts a single mobile computing device 250, some embodiments include a plurality of mobile computing devices, each communicatively coupled to the store computing system 400 by the store computing network 225.

While the computing network 1000 depicted in FIG. 10 includes both the enterprise computing network 215 and the store computing network 225, it should be understood that in other embodiments, the enterprise computing system 300, the store computing system 400, the retail associate device 230, the personal assistant and liaison device 240, the mobile computing device 250, the shadow box 310, the second camera 530, and the plurality of display units 118, may be communicatively coupled by a single computer network, or by additional computer networks other than the enterprise computing network 215 and the store computing network 225.

Figure 11:
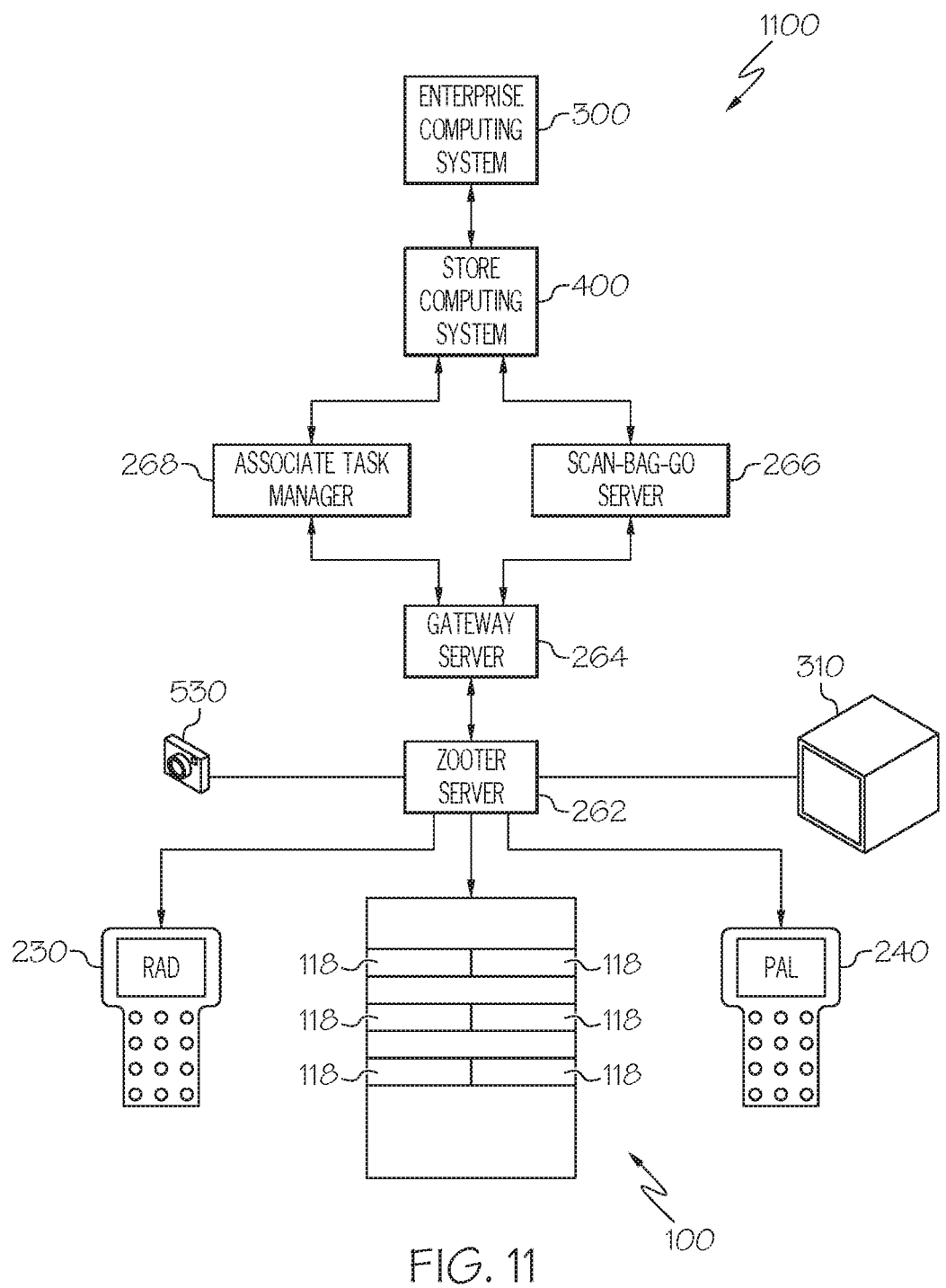
FIG. 11 schematically depicts an architecture of a computing network for controlling a shadow box, a second camera, and shelf display units, according to one or more embodiments shown and described herein.

Referring now to FIG. 11, an architecture of a computing network 1100 is schematically depicted. The computing network 1100 includes the enterprise computing system 300, the store computing system 400, the retail associate device 230, the personal assistant and liaison device 240, the plurality of display units 118, the shadow box 310, the second camera 530, a zooter server 262, a gateway server 264, a scan-bag-go server 266, and an associate task manager server 268. Each of the zooter server 262, the gateway server 264, the scan-bag-go server 266, and the associate task manager server 268 includes a processor, a data storage component, a non-transitory memory component, input/output hardware, network interface hardware, and a local interface. Each of the components depicted in FIG. 11 are interconnected by one or more computing networks, which are not separately depicted. The associate task manager server 268 relays information between the retail associate device 230 and the store computing system 400. The scan-bag-go server 266 relays information between the personal assistant and liaison device 240 and the store computing system 400. The gateway server 264 relays information among the associate task manager server 268, the scan-bag-go server 266, and the zooter server 262. The zooter server 262 relays information among the gateway server 264, the plurality of display units 118, the shadow box 310, the personal assistant and liaison device 240, and the retail associate device 230. The specific architecture depicted in FIG. 11 does not limit the embodiments described herein. Other architectures may not include one or more of the depicted components, such as embodiments that do not include one or more of the intermediary components (e.g., the associate task manager server 268, the scan-bag-go server 266, the gateway server 264, or the zooter server 262).

Figure 12:
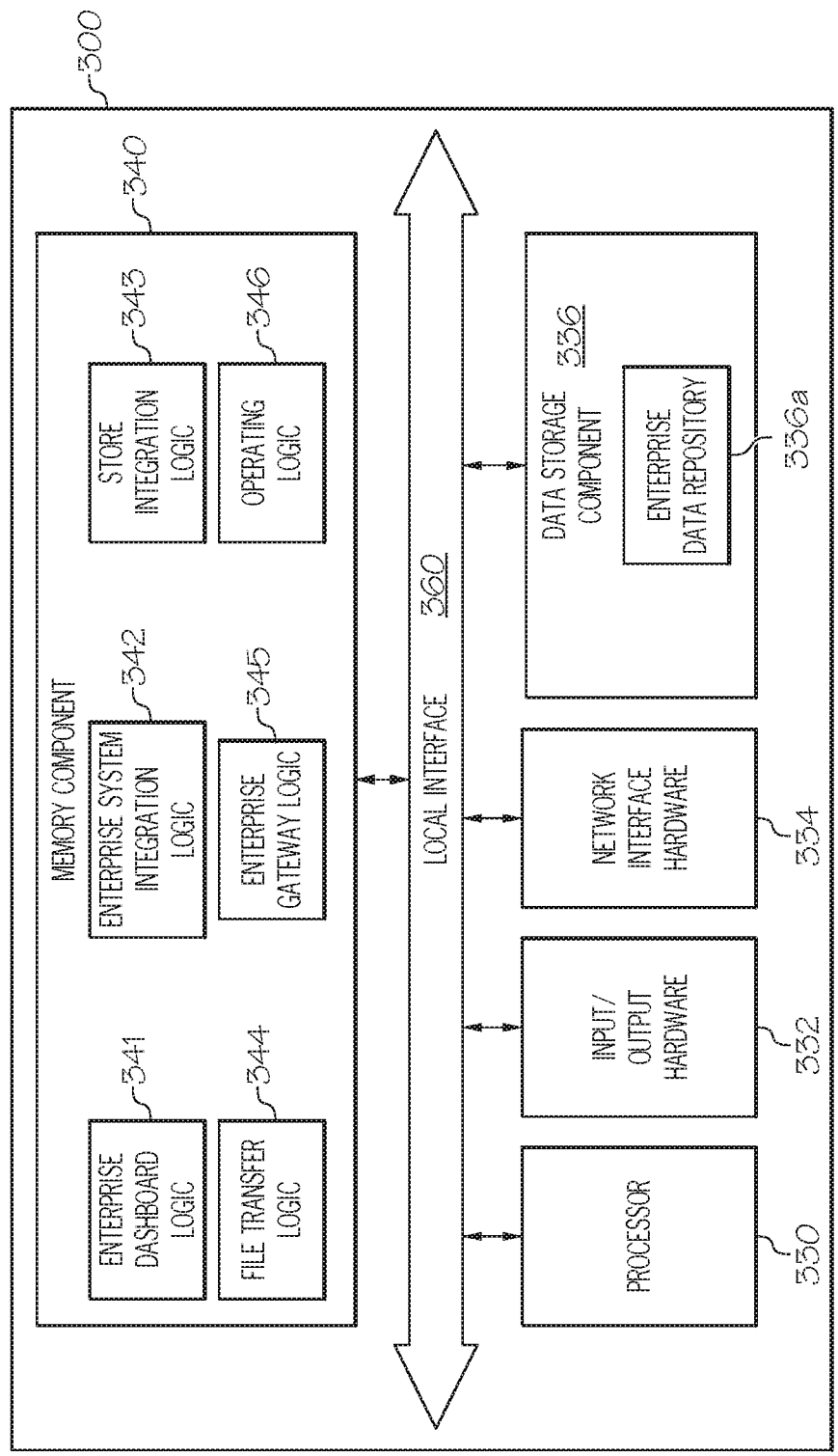
FIG. 12 schematically depicts an enterprise computing system, according to one or more embodiments shown and described herein.

FIG. 12 depicts additional details regarding the enterprise computing system 300 from FIG. 10. In some embodiments, the enterprise computing system 300 may be configured as a general purpose computer with the requisite hardware, software, and/or firmware. In some embodiments, the enterprise computing system 300 may be configured as a special purpose computer designed specifically for performing the functionality described herein.

As illustrated in FIG. 12, the enterprise computing system 300 includes a processor 330, input/output hardware 332, network interface hardware 334, a data storage component 336, and a non-transitory memory component 340. The memory component 340 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 340 may be configured to store enterprise dashboard logic 341, enterprise system integration logic 342, store integration logic 343, file transfer logic 344, enterprise gateway logic 345, and operating logic 346 (each of which may be embodied as a computer program, firmware, or hardware, as an example). A local interface 350 is also included in FIG. 12 and may be implemented as a bus or other interface to facilitate communication among the components of the enterprise computing system 300.

Still referring to FIG. 12, the processor 330 may include any processing component configured to receive and execute instructions (such as from the data storage component 336 and/or memory component 340). The input/output hardware 332 may include a monitor, keyboard, mouse, printer, camera, microphone, speaker, touch-screen, and/or other device for receiving, sending, and/or presenting data. The network interface hardware 334 may include any wired or wireless networking hardware, such as a modem, LAN port, wireless fidelity (Wi-Fi) card, WiMax card, mobile communications hardware, and/or other hardware for communicating with other networks (e.g., the enterprise computing network 215) and/or devices.

The data storage component 336 may reside local to and/or remote from the enterprise computing system 300 and may be configured to store one or more pieces of data for access by the enterprise computing system 300 and/or other components. As illustrated in FIG. 12, the data storage component 336 may store an enterprise data repository 336a, which may include product data pertaining to products to be sold at one or more store locations, pricing data pertaining to the products to be sold at the one or more store locations, planogram data pertaining to the placement of products on shelves, and label data to be displayed on shelf display units at the one or more store locations, multimedia content (e.g., pictures, video, sound, or the like). The enterprise data repository 336a may be stored in one or more data storage devices. In another embodiment, the enterprise computing system 300 may be coupled to a remote server or data storage device that includes at least some of the data in the enterprise data repository 336a. Other data may be stored in the data storage component 336 to provide support for functionalities described herein.

Still referring to FIG. 12, the memory component 340 includes the enterprise dashboard logic 341, the enterprise system integration logic 342, the store integration logic 343, the file transfer logic 344, the enterprise gateway logic 345, and the operating logic 346. The enterprise dashboard logic 341 includes machine readable instructions that when executed by the processor 330 cause the enterprise computing system 300 to display a graphical user interface for managing the enterprise data repository 336a. In some embodiments, the graphical user interface may allow for the management or adjustment of data to be transmitted to the store computing system 400 or to be displayed one the plurality of display units 118. In some embodiments, the graphical user interface may allow for control of the content displayed on the plurality of display units 118. The enterprise system integration logic 342 includes machine readable instructions that when executed by the processor 330 cause the enterprise computing system 300 to process events from other enterprise services. In some embodiments, the enterprise system integration logic 342 receives and handles planogram events, such as the updating of planograms. The store integration logic 343 includes machine readable instructions that when executed by the processor 330 cause the enterprise computing system 300 to transmit messages or data to the store computing system 400 or receive messages or data from the store computing system 400. The file transfer logic 344 includes machine readable instructions that when executed by the processor 330 cause the enterprise computing system 300 to transfer files, such as video or other multimedia files to the store computing system 400. In some embodiments, the file transfer logic 344 includes an IBM MQ extension that facilitates the transfer of video files to the store computing system 400 so that the store computing system 400 causes the video files to be displayed on at least one of the plurality of display units 118. The enterprise gateway logic 345 includes machine readable instructions that when executed by the processor 330 cause the enterprise computing system 300 to transmit messages to or receive messages from the store computing system 400.

In some embodiments, the enterprise gateway logic 345 may transmit and receive all messages to and from the store computing system 400, but may forward or receive only messages pertaining to the plurality of display units 118 to the store integration logic 343. The operating logic 346 may include an operating system and/or other software for managing components of the enterprise computing system 300.

It should be understood that the components illustrated in FIG. 12 are merely exemplary and are not intended to limit the scope of this disclosure. More specifically, while the components in FIG. 12 are illustrated as residing within the enterprise computing system 300, this is a non-limiting example. In some embodiments, one or more of the components may reside external to the enterprise computing system 300.

Figure 13:
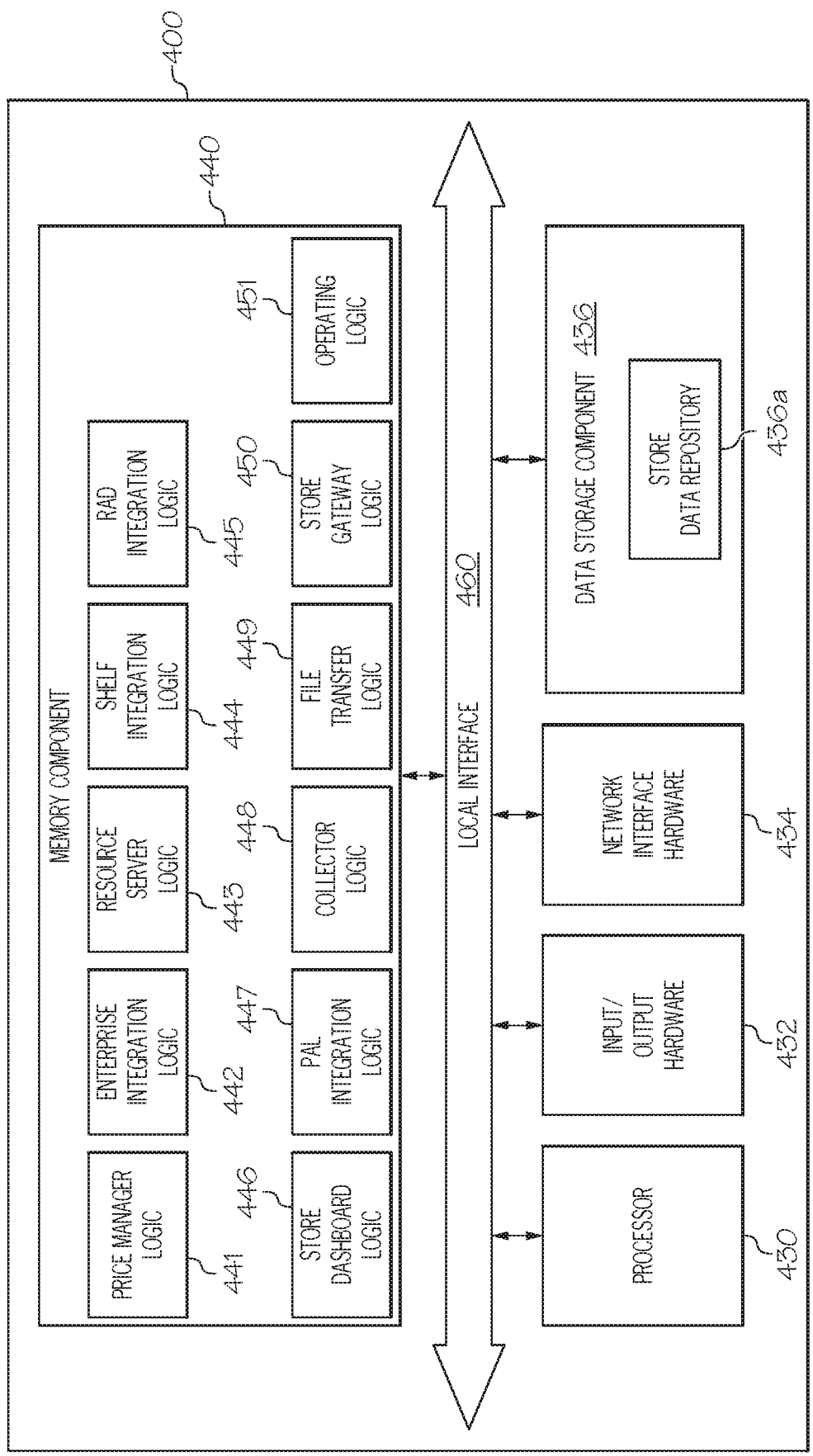
FIG. 13 schematically depicts a store computing system, according to one or more embodiments shown and described herein.

FIG. 13 depicts additional details regarding the store computing system 400 from FIG. 10. In some embodiments, the store computing system 400 may be configured as a general purpose computer with the requisite hardware, software, and/or firmware. In some embodiments, the store computing system 400 may be configured as a special purpose computer designed specifically for performing the functionality described herein.

As illustrated in FIG. 13, the store computing system 400 includes a processor 430, input/output hardware 432, network interface hardware 434, a data storage component 436, and a non-transitory memory component 440. The memory component 440 may be configured as volatile and/or non-volatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 440 may be configured to store price manager logic 441, enterprise integration logic 442, resource server logic 443, shelf integration logic 444, RAD integration logic 445, store dashboard logic 446, PAL integration logic 447, collector logic 448, file transfer logic 449, store gateway logic 450, and operating logic 451 (each of which may be embodied as a computer program, firmware, or hardware, as an example). A local interface 460 is also included in FIG. 4 and may be implemented as a bus or other interface to facilitate communication among the components of the store computing system 400.

Still referring to FIG. 13, the processor 430 may include any processing component configured to receive and execute instructions (such as from the data storage component 436 and/or memory component 440). The input/output hardware 432 may include a monitor, keyboard, mouse, printer, camera, microphone, speaker, touch-screen, and/or other device for receiving, sending, and/or presenting data. The network interface hardware 434 may include any wired or wireless networking hardware, such as a modem, LAN port, wireless fidelity (Wi-Fi) card, WiMax card, mobile communications hardware, and/or other hardware for communicating with other networks (e.g., the enterprise computing network 215 or the store computing network 225) and/or devices.

The data storage component 436 may reside local to and/or remote from the store computing system 400 and may be configured to store one or more pieces of data for access by the store computing system 400 and/or other components. As illustrated in FIG. 4, the data storage component 436 may store a store data repository 436a, which may include inventory quantities pertaining to products on shelves, product dimension information, product weight information, product data pertaining to products to be sold at the store, pricing data pertaining to the products to be sold at the store, planogram data pertaining to the placement of products on shelves at the store, and label data to be displayed on shelf display units at the store, multimedia content (e.g., pictures, video, or the like). The store data repository 436*a* may be stored in one or more data storage devices. In another embodiment, the store computing system 400 may be coupled to a remote server or data storage device that includes at least some of the data in the store data repository 436*a*. Other data may be stored in the data storage component 436 to provide support for functionalities described herein.

Still referring to FIG. 13, the memory component 440 includes the price manager logic 441, the enterprise integration logic 442, the resource server logic 443, the shelf integration logic 444, the RAD integration logic 445, the store dashboard logic 446, the PAL integration logic 447, the collector logic 448, the file transfer logic 449, the store gateway logic 450, and the operating logic 451. The collector logic 448 includes machine readable instructions that when executed by the processor 430 cause the store computing system 400 to collect data from a number of resources (e.g., inventory quantities, price data, point of sale information, label information, etc.) and transmits electronic shelf label events to the price manager logic. The price manager logic 441 includes machine readable instructions that when executed by the processor 430 cause the store computing system 400 to process the electronic shelf label events transmitted by the collector logic 448. The enterprise integration logic 442 includes machine readable instructions that when executed by the processor 430 cause the store computing system 400 to transmit messages or data to the enterprise computing system 300 or receive messages or data from the enterprise computing system 300. The resource server logic 443 includes machine readable instructions that when executed by the processor 430 cause the store computing system 400 to render image or video data, such as tags, banners, tag templates, or video content to be displayed on the plurality of display units 118. The shelf integration logic 444 sends messages or content to the plurality of display units 118 for display by the plurality of display units 118. In some embodiments, the shelf integration logic 444 may be external to the store computing system 400. The RAD integration logic 445 includes machine readable instructions that when executed by the processor 430 cause the store computing system 400 to receive messages from and transmits messages to the retail associate device 230. The store dashboard logic 446 includes machine readable instructions that when executed by the processor 430 cause the store computing system 400 to display a graphical user interface for managing the store data repository 436*a*. In some embodiments, the graphical user interface may allow for the management or adjustment of data to be displayed one the plurality of display units 118. In some embodiments, the graphical user interface may allow for control of the content displayed on the plurality of display units 118. The PAL integration logic 447 includes machine readable instructions that when executed by the processor 430 cause the store computing system 400 to receive messages from and transmit messages to the personal assistant and liaison device 240. The file transfer logic 449 includes machine readable instructions that when executed by the processor 430 cause the store computing system 400 to receive files, such as video or other multimedia files from the enterprise computing system 300. In some embodiments, the file transfer logic 449 includes an IBM MQ extension that facilitates the transfer of video files to the store computing system 400. The store gateway logic 450 includes machine readable instructions that when executed by the processor 430 cause the store computing system 400 to transmit messages to or receive messages from the enterprise computing system 300. In some embodiments, the store gateway logic 450 may transmit and receive all messages to and from the enterprise computing system 300, but may forward or receive only messages pertaining to the plurality of display units 118 to the enterprise integration logic 442. The operating logic 451 may include an operating system and/or other software for managing components of the store computing system 400.

It should be understood that the components illustrated in FIG. 13 are merely exemplary and are not intended to limit the scope of this disclosure. More specifically, while the components in FIG. 8 are illustrated as residing within the store computing system 400, this is a non-limiting example. In some embodiments, one or more of the components may reside external to the store computing system 400.

Figure 14:
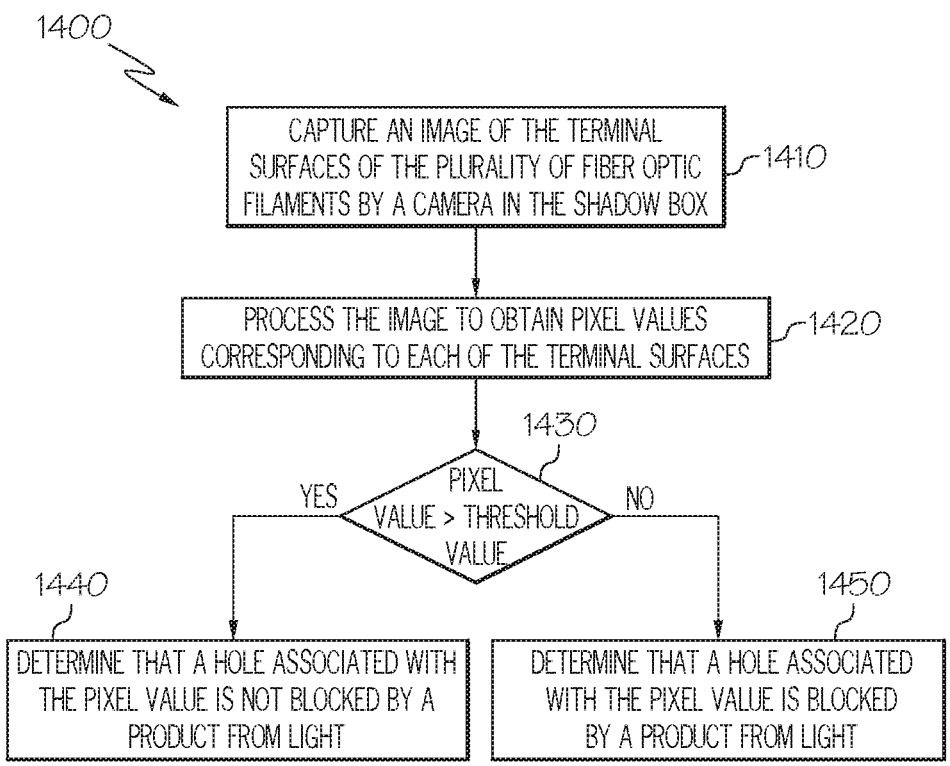
FIG. 14 graphically illustrates a computer-implemented method of determining whether holes on a shelf are blocked from light, according to one or more embodiments shown and described herein.
Figure 15:
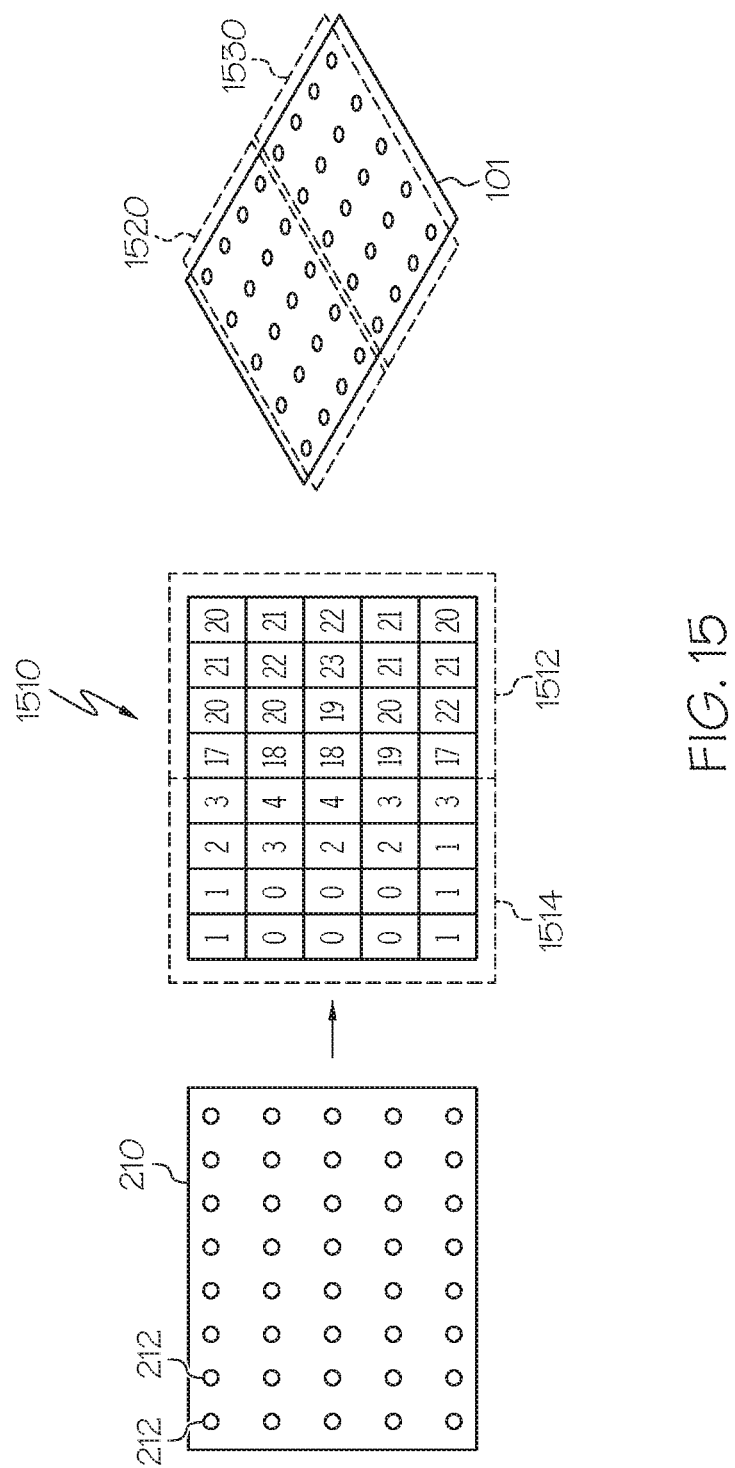
FIG. 15 schematically depicts converting an image of terminal surfaces of fiber optic filaments to pixel values and determining whether holes on a shelf are blocked from light, according to one or more embodiments shown and described herein.

FIG. 14 graphically illustrates a method 1400 of determining whether the hole 104 on the top surface 102 of the shelf 101 is blocked from light. At step 1410, the camera 320 in the shadow box 310 captures an image of the terminal surfaces 212 of the plurality of fiber optic filaments 108. For example, as illustrated in FIG. 15, the holder 210 exposing the plurality of terminal surfaces 212 is captured by the camera 320. The captured image is transmitted to the store computing system 400 via the computing network 1000.

At step 1420, the processor 430 of the store computing system 400 processes the captured image to obtain pixel values corresponding to each of the terminal surfaces 212 of the plurality of fiber optic filaments 108. The processor 430 may determine the brightness of each of the terminal surfaces 212 of the plurality of fiber optic filaments 108 and convert the brightness to a pixel value. For example, a table 1510 in FIG. 15 includes pixel values which correspond to terminal surfaces 212, respectively. In another embodiment, a processor of the camera 320 may process the capture image to obtain pixel values and transmit the pixel values to the store computing system 400. The pixel value may be one of the several visual characteristics, e.g., an optical intensity, a color spectrum, or light density.

At step 1430, the processor 430 determines whether the pixel value is greater than a threshold value. The threshold value may be a pre-defined value. For example, the threshold value may be 10, and the pixel values in the table 1510 are compared to the threshold value of 10. In some embodiments, the threshold value may be calculated based on the pixel values obtained at step 1420. For example, the threshold value may be an average value of the highest pixel value (e.g., 23 in table 1510) and the lowest pixel value (zero in table 1510).

If the pixel value is greater than the threshold value, at step 1440, the processor 430 determines that the hole 104 associated with the pixel value is not blocked by a product from light. For example, twenty pixel values 1512 on the right side of the table 1510 are greater than the threshold value (e.g., 10), and thus the processor 430 determines that the set of holes 1530 on the shelf 101 are not blocked as illustrated in FIG. 15.

If the pixel value is not greater than the threshold value, at step 1450, the processor 430 determines that the hole 104 associated with the pixel value is blocked by a product from light. For example, twenty pixel values 1514 on the left side of the table 1510 are less than the threshold value (e.g., 10), and thus the processor 430 determines that the set of holes 1520 on the shelf 101 are blocked as illustrated in FIG. 15.

Figure 16:
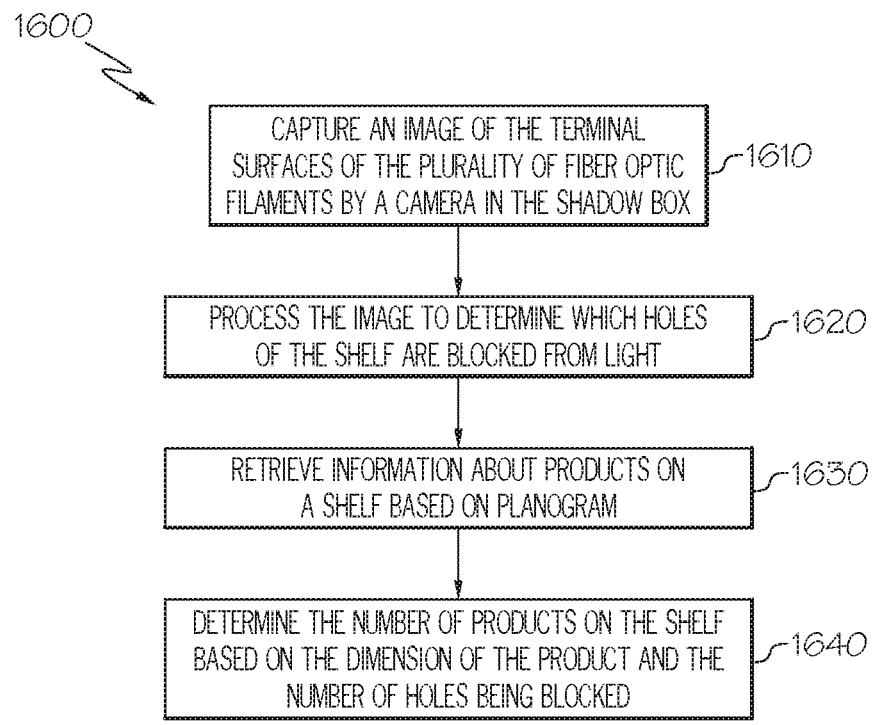
FIG. 16 graphically illustrates a computer-implemented method of determining the number of products on the shelf according to one or more embodiments shown and described herein.

Referring now to FIG. 16, a flowchart that graphically illustrates a method 1600 of determining the number of products (i.e., inventory quantities) on the shelf 101. At step 1610, the camera 320 in the shadow box 310 captures an image of the terminal surfaces 212 of the plurality of fiber optic filaments 108. The captured image is transmitted to the store computing system 400 via the computing network 1000.

At step 1620, the processor 430 of the store computing system 400 processes the captured image to determine which holes of the shelf 101 are blocked from light. The details of determining whether a hole 104 is blocked from light are described above with reference to FIGS. 14 and 15.

At step 1630, the processor 430 of the store computing system 400 retrieves information about products on the shelf 101 based on planogram stored in the store data repository 436a. The processor 430 of the store computing system 400 may retrieve dimension information (e.g., width, length, and height) about the products from the planogram stored in the store data repository 436a. In some embodiments, the processor 430 of the store computing system 400 may also retrieve weight information about the products based on the planogram.

At step 1640, the processor 430 of the store computing system 400 determines the number of products on the shelf based on the dimension of the product and the number of holes being blocked. The processor 430 determines the bottom area of the product when placed on a shelf 101 based on the dimension of the product. In one embodiment, a product 1710 is placed on the shelf 101 as illustrated in FIG. 17A. The processor 430 determines the bottom area S1 for the product 1710 based on the dimension of the product 1710 which is stored in the store data repository 436a. Then, the processor 430 of the store computing system 400 determines the average number of holes 104 being blocked by the area S1. For example, the average number holes 104 being blocked by the area S1 is four as illustrated in FIG. 17B. The average number of holes being blocked by the area S1 may be pre-stored in the store data repository 436a, and the processor may retrieve the pre-stored number related to the product 1710. Then, the processor 430 determines the number of products on the shelf 101 by comparing the average number of holes being blocked by a product with the number of holes being blocked determined at step 1620. For example, if the number of holes being blocked determined at step 1620 is twenty four (24) and the average number of holes being blocked by the area S1 is four (4), the processor 430 may determine that six products 1710 are placed on the shelf 101 provided that one product 1710 is not stacked over another product 1710. Whether a product is stacked over another product can be determined by the second camera 530 in FIG. 5A, which will be described below with reference to FIG. 18.

In another embodiment, a product 1720 is placed on the shelf 101 as illustrated in FIG. 17C. The product 1720 is in a cylindrical shape. The processor 430 determines the bottom area S2 for the product 1720 based on the dimension of the product 1720 which is stored in the store data repository 436a. Then, the processor 430 of the store computing system 400 determines the average number of holes 104 being blocked by the area S2. For example, the average number holes 104 being blocked by the area S2 is two (2) as illustrated in FIG. 17D. The average number of holes being blocked by the area S2 may be pre-stored in the store data repository 436a, and the processor may retrieve the pre-stored number related to the product 1720. Then, the processor 430 determines the number of products on the shelf 101 by comparing the average number of holes being blocked by a product with the number of holes being blocked determined at step 1620. For example, if the number of holes being blocked determined at step 1620 is eighteen (18) and the average number of holes being blocked by the area S2 is two (2), the processor 430 may determine that nine products 1720 are placed on the shelf 101 provided that one product 1720 is not stacked over another product 1720. The processor 430 of the store computing system 400 may update the planogram data based on the number of products on the shelves.

Figure 18:
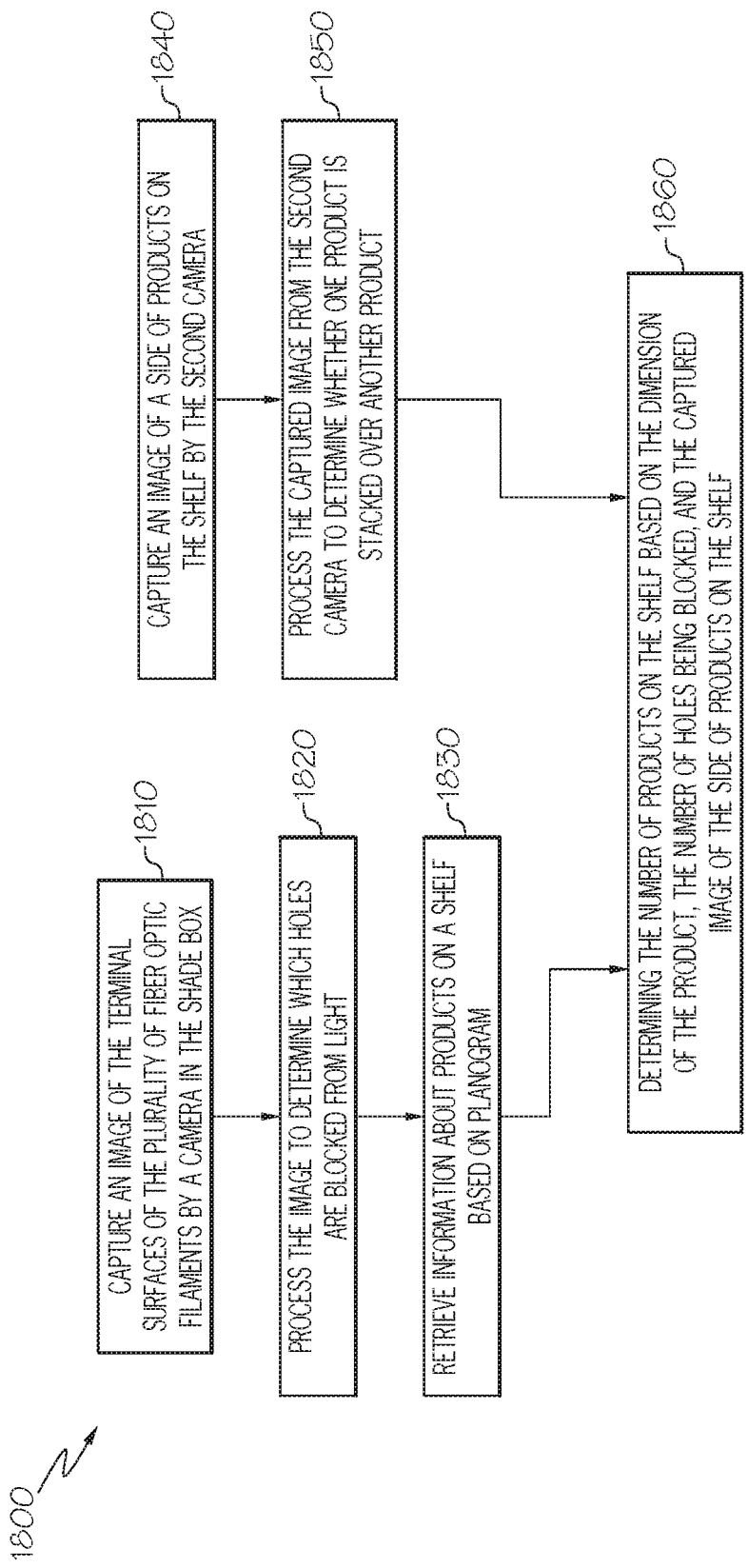
FIG. 18 graphically illustrates a computer-implemented method of determining the number of objects on the shelf according to one or more embodiments shown and described herein.

Referring now to FIG. 18, a flowchart that graphically illustrates a method 1800 of determining the number of products (i.e., inventory quantities) on the shelf 101. At step 1810, the camera 320 in the shadow box 310 captures an image of the terminal surfaces 212 of the plurality of fiber optic filaments 108. The captured image is transmitted to the store computing system 400 via the computing network 1000.

At step 1820, the processor 430 of the store computing system 400 processes the captured image to determine which holes of the shelf 101 are blocked from light. The details of determining whether a hole 104 is blocked from light are described above with reference to FIGS. 14 and 15.

At step 1830, the processor 430 of the store computing system 400 retrieves information about products on the shelf 101 from the planogram stored in the store data repository 436a. The processor 430 of the store computing system 400 may retrieve dimension information (e.g., width, length, and height) about the products based on the planogram. In some embodiments, the processor 430 of the store computing system 400 may also retrieve weight information about the products based on the planogram.

At step 1840, the second camera 530 captures an image of a side of products on the shelf 101, for example, the image as illustrated in FIG. 5C. The second camera 530 may transmit the captured image to the store computing system 400 via the computing network 1000.

Figure 19:
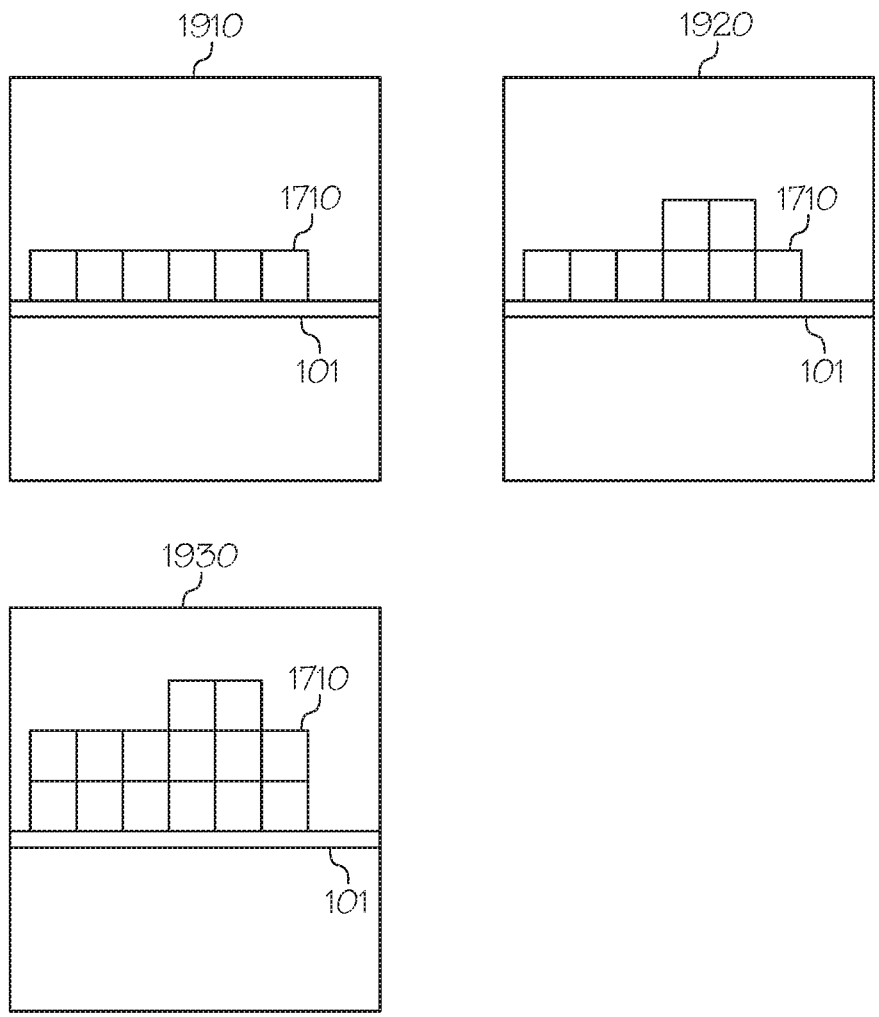
FIG. 19 depicts images of the side of products on a shelf captured by a second camera according to one or more embodiments shown and described herein.

At step 1850, the processor 430 of the store computing system 400 processes the captured image from the second camera 530 to determine whether one product is stacked over another product. For example, the processor 430 may process the captured image 1910 in FIG. 19 and determine that no product is stacked over another product. In another example, the processor 430 may process the captured image 1920 in FIG. 19, and determine that some products are stacked over other products and at least two layers of products are present on the shelf 101. In another example, the processor 430 may process the captured image 1930 as shown in FIG. 19, and determine that some products are stacked over other products, and at least three layers of products are present on the shelf 101. In some embodiment, the processor 430 of the store computing system 400 may process the capture image from the second camera 530 to determine product information, e.g., what the product is, the dimension of the product, etc. In another embodiment, the second camera 530 may process the capture image to determine product information, and transmit the product information to the store computing system 400.

At step 1860, the processor 430 of the store computing system 400 determines the number of products on the shelf 101 based on the dimension of the product, the number of holes 104 being blocked, and the captured image of the side of products on the shelf 101. The processor 430 determines the bottom area of the product when placed on the shelf based on the dimension of the product. In one embodiment, a product 1710 is placed on the shelf 101 in FIG. 17A. The processor 430 determines the bottom area S1 for the product 1710 based on the dimension of the product 1710 which is stored in the store data repository 436a. Then, the processor 430 of the store computing system 400 determines the average number of holes 104 being blocked by the area S1. For example, the average number holes 104 being blocked by the area S1 is four as illustrated in FIG. 17B. The average number of holes being blocked by the area S1 may be pre-stored in the store data repository 436a, and the processor may retrieve the pre-stored number related to the product 1710. Then, the processor 430 determines the number of products on the shelf 101 by comparing the average number of holes being blocked by a product with the number of holes being blocked determined at step 1820. For example, if the number of holes being blocked determined at step 1820 is twenty four (24) and the average number of holes being blocked by the area S1 is four (4), the processor 430 may determine that at least six products 1710 are placed on the shelf 101. If the stacking information determined at step 1850 provides that no product 1710 is stacked over another product 1710, the processor 430 confirms that six products 1710 are placed on the shelf 101. If the stacking information determined at step 1850 provides that two layers of the products 1710 are present on the shelf 101, similar to the captured image 1920 in FIG. 19, the processor 430 may determine that the number of products 1710 is between 7 and 12. If the stacking information determined at step 1850 provides that three layers of the products 1710 are present on the shelf similar to the captured image 1930, the processor 430 may determine that the number of products 1710 is between 13 and 18. In some embodiments, weight information about products on the shelf 101 that is obtained by the weight sensor 107 in FIG. 2A may be used to determine the exact number of products 1710 based on weight information per the product that is stored in the store data repository 436a. The processor 430 of the store computing system 400 may update the planogram data based on the number of products on the shelves.

Figure 20:
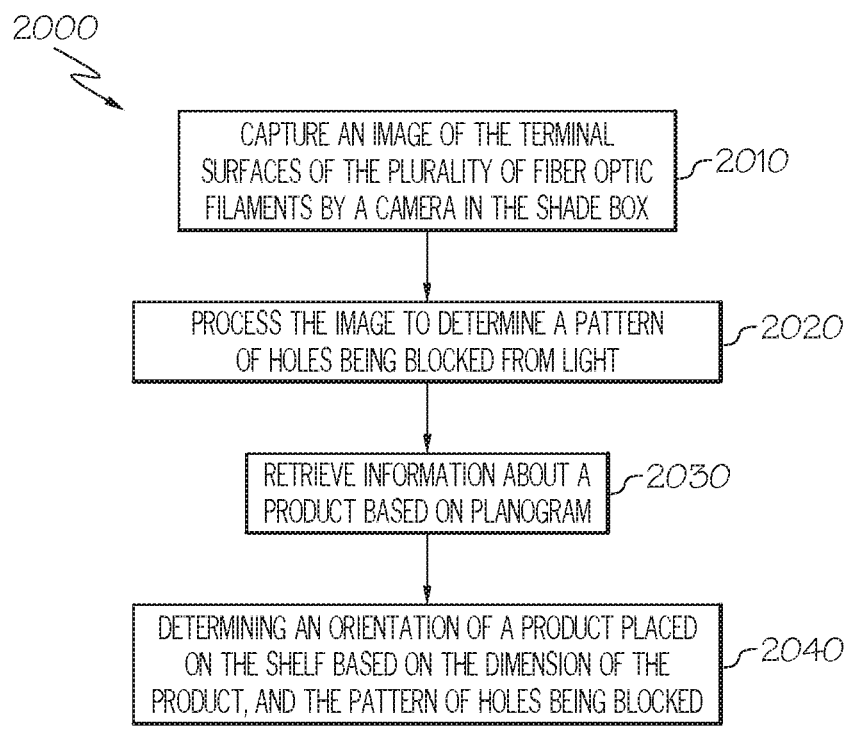
FIG. 20 graphically illustrates a computer-implemented method of determining an orientation of a product on a shelf according to one or more embodiments shown and described herein.

Referring now to FIG. 20, a flowchart that graphically illustrates a method 2000 of determining an orientation of a product placed on the shelf 101. At step 2010, the camera 320 in the shadow box 310 captures an image of the terminal surfaces 212 of the plurality of fiber optic filaments 108. The captured image is transmitted to the store computing system 400 via the computing network 1000.

At step 2020, the processor 430 of the store computing system 400 processes the captured image to determine a pattern of holes being blocked from light. The details of determining whether a hole 104 is blocked from light are described above with reference to FIGS. 14 and 15.

At step 2030, the processor 430 of the store computing system 400 retrieves information about products on the shelf 101 from the planogram stored in the store data repository 436a. The processor 430 of the store computing system 400 may retrieve dimension information (e.g., width, length, and height) about the products based on the planogram.

Figure 21C:
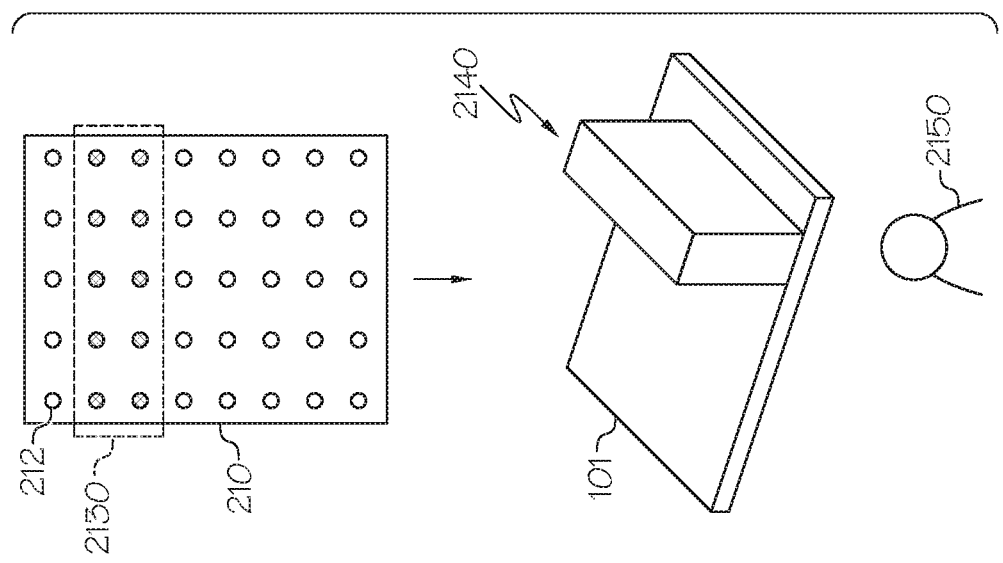
FIGS. 21A, 21B and 21C schematically depict determining an orientation of a product on a shelf according to one or more embodiments shown and described herein.

At step 2040, the processor 430 of the store computing system 400 determines an orientation of a product placed on the shelf based on the dimension of the product and a pattern of holes being blocked. For example, in FIG. 21A, a set of terminal surfaces 2110 are relatively dark compared to other terminal surfaces 212. The store computing system 400 determines that the holes 104 corresponding to the set of terminal surfaces 2110 are blocked from light. Based on the pattern of holes 104 being blocked, the store computing system 400 determines that a product 2140 is placed obliquely on the shelf 101 from a perspective of a customer 2150 as shown in FIG. 21A. When a product is placed obliquely on the shelf 101, the store computing system 400 may alert an employee by sending a message to a retail associate device 230, or a mobile computing device 250 that the product on the shelf 101 needs to be organized (e.g., re-facing). For example, an employee may receive a message to bring products to the front of the shelf for presentation value, which allows customers to easily access products on high or low shelves. In addition, the store computing system 400 may instruct the lighting source 322 to light up such that the holes 104 on the top surface 102 of the shelf 101 are illuminated in order to alert employees with respect to the shelf 101. In some embodiments, the processor 430 of the store computing system 400 may determine product placement location on the shelf 101 based on the dimension of the product and a pattern of holes being blocked. The processor 430 of the store computing system 400 may update the planogram data based on the orientation of products on the shelves.

Figure 21B:
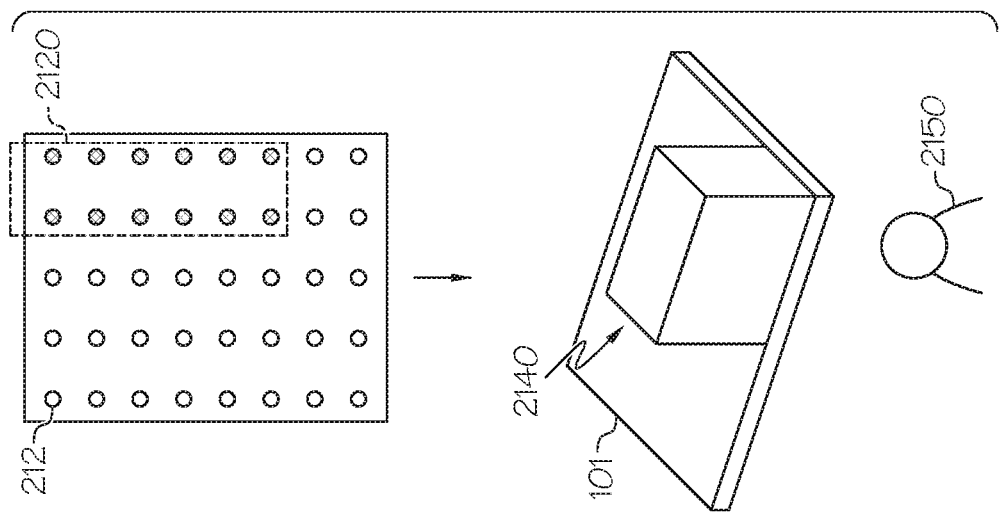
Figure 21A:
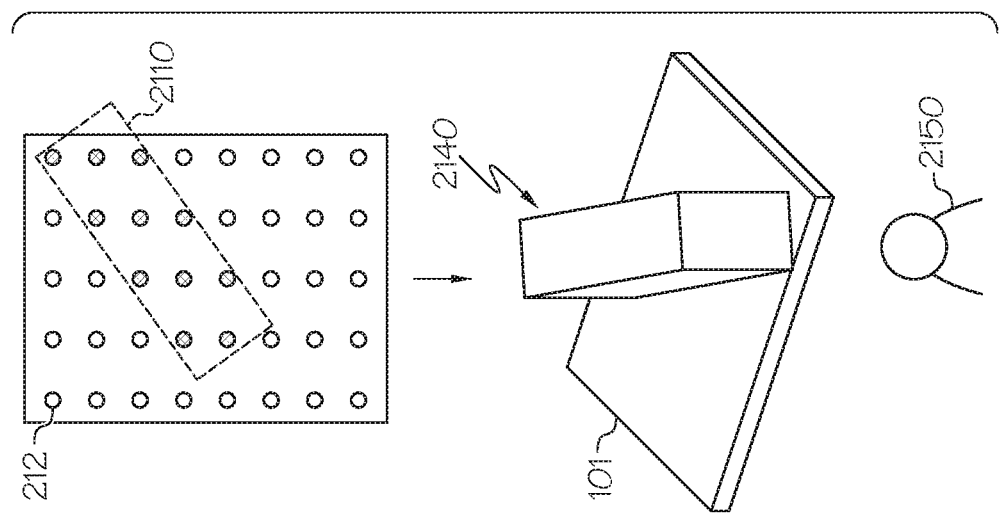

As another example, in FIG. 21B, a set of terminal surfaces 2120 are relatively dark compared to other terminal surfaces 212. The store computing system 400 determines that the holes 104 corresponding to the set of terminal surfaces 2120 are blocked from light. Based on the pattern of holes 104 being blocked, the store computing system 400 determines that the product 2140 is placed on the shelf 101 with a top surface 2124 facing a customer 2150 as shown in FIG. 21B. As another example, in FIG. 21C, a set of terminal surfaces 2130 are relatively dark compared to other terminal surfaces 212. The store computing system 400 determines that the holes 104 corresponding to the set of terminal surfaces 2130 are blocked from light. Based on the pattern of holes 104 being blocked, the store computing system 400 determines that the product 2140 is placed on the shelf 101 with a side surface 2126 facing a customer 2150 as shown in FIG. 21C.

Figure 22:
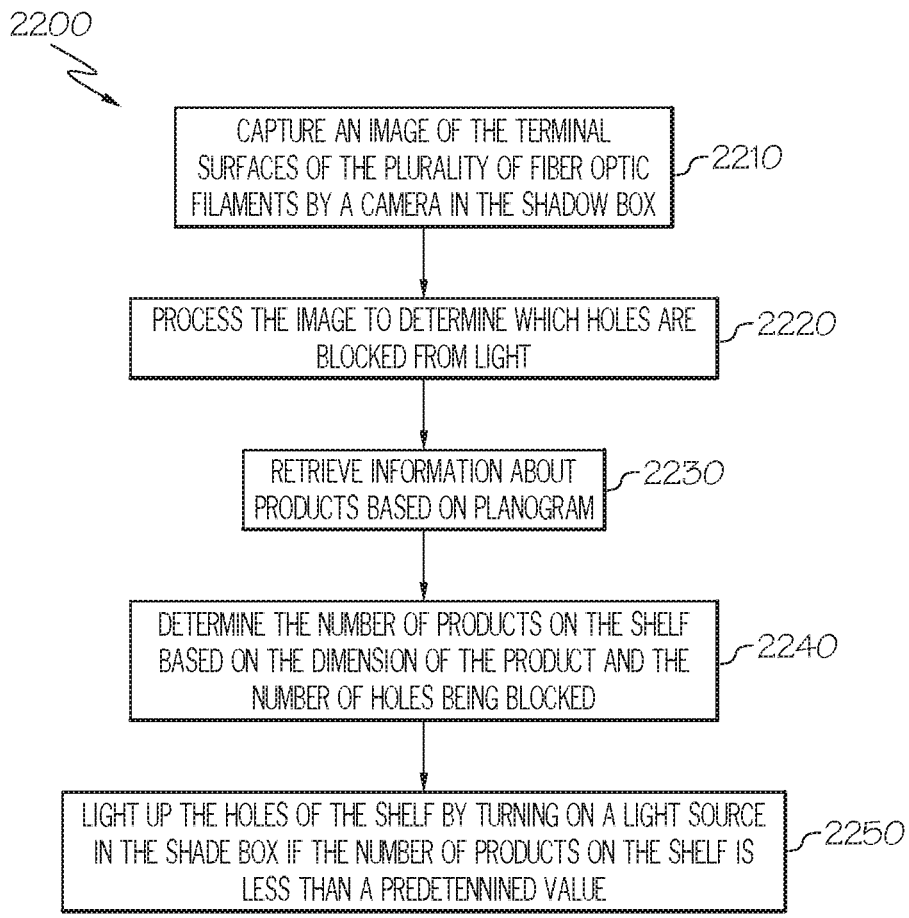
FIG. 22 graphically illustrates a computer-implemented method of determining whether products should be stocked on a shelf according to one or more embodiments shown and described herein.

Referring now to FIG. 22, a flowchart that graphically illustrates a method 2200 of indicating low in stock or out of stock. At step 2210, the camera 320 in the shadow box 310 captures an image of the terminal surfaces 212 of the plurality of fiber optic filaments 108. The captured image is transmitted to the store computing system 400 via the computing network 1000.

At step 2220, the processor 430 of the store computing system 400 processes the captured image to determine which holes of the shelf 101 are blocked from light. The details of determining whether a hole 104 is blocked from light are described above with reference to FIGS. 14 and 15.

At step 2230, the processor 430 of the store computing system 400 retrieves information about products on the shelf 101 from the planogram stored in the store data repository 436a. The processor 430 of the store computing system 400 may retrieve dimension information (e.g., width, length, and height) about the products based on the planogram. In some embodiments, the processor 430 of the store computing system 400 may also retrieve weigh information about the products based on the planogram.

At step 2240, the processor 430 of the store computing system 400 determines the number of products on the shelf 101 based on the dimension of the product and the number of holes being blocked. Details of determining the number of products on the shelf 101 are described above with reference to FIGS. 16 and 18.

At step 2250, the processor 430 of the store computing system 400 turns on the lighting source 322 in the shadow box 310 to light up the holes 104 of the shelf 101 if the number of products on the shelf 101 is less than a predetermined value. For example, if the predetermined value is three and the number of products on the shelf 101 is two, the store computing system 400 determines that the shelf 101 is low in stock and turns on the lighting source 322 associated with the shelf 101. The lighting source 322 may emit a certain color of light in response to the determination that the shelf 101 is low in stock. The store computing system 400 may change display content of the display unit 118 for the shelf 101 in response to determination that the shelf 101 is low in stock. For example, the store computing system 400 may raise the price displayed in the display unit 118. As another example, the store computing system 400 may instruct other display units 118 to display content that lures customers in order to avert customers from buying products that are low in stock. As another example, the store computing system 400 may instruct other display units 118 to lower the prices of products comparable to the products that are low in stock. As another example, the store computing system 400 may send a message to a retail associate device 230, or a mobile computing device 250 that the shelf 101 need to be restocked. As another example, the store computing system 400 may send a message to a robot to restock products on the shelf 101 in response to the determination that the shelf 101 is low in stock. As another example, the store computing system 400 may update a product placement database with a note that the shelf 101 is low in stock. As another example, the store computing system 400 may automatically trigger reorder of the product low in stock from a warehouse in response to determination that the number of products on the shelf 101 is less than a predetermined value.

If the number of products on the shelf 101 is zero, the processor 430 of the store computing system 400 determines that the shelf 101 is out of stock and turns on the lighting source 322 associated with the shelf 101 in order to alert store employees regarding the out of stock. For example, the processor 430 of the store computing system 400 instructs the lighting source 322 to emit a certain color of light. As another example, the processor 430 of the store computing system 400 may instruct the lighting source 322 to blink in order to alert store employees. The store computing system 400 may change display content of the display unit 118 for the shelf 101 in response to determination that the shelf 101 is out of stock. For example, the store computing system 400 may instruct the display unit 118 to display "out of stock." As another example, the store computing system 400 may instruct other display units 118 to display content that lures customers, such that the customers buy alternatives to the product that is out of stock. As another example, the store computing system 400 may send a message to a retail associate device 230, or a mobile computing device 250 that the shelf 101 need to be restocked. As another example, the store computing system 400 may send a message to a robot to restock products on the shelf 101 in response to the determination that the shelf 101 is out of stock. As another example, the store computing system 400 may update a product placement database with a note that the shelf 101 is out of stock. As another example, the store computing system 400 may automatically trigger reorder of the product from a warehouse in response to determination that the number of products on the shelf 101 is zero.

Figure 23:
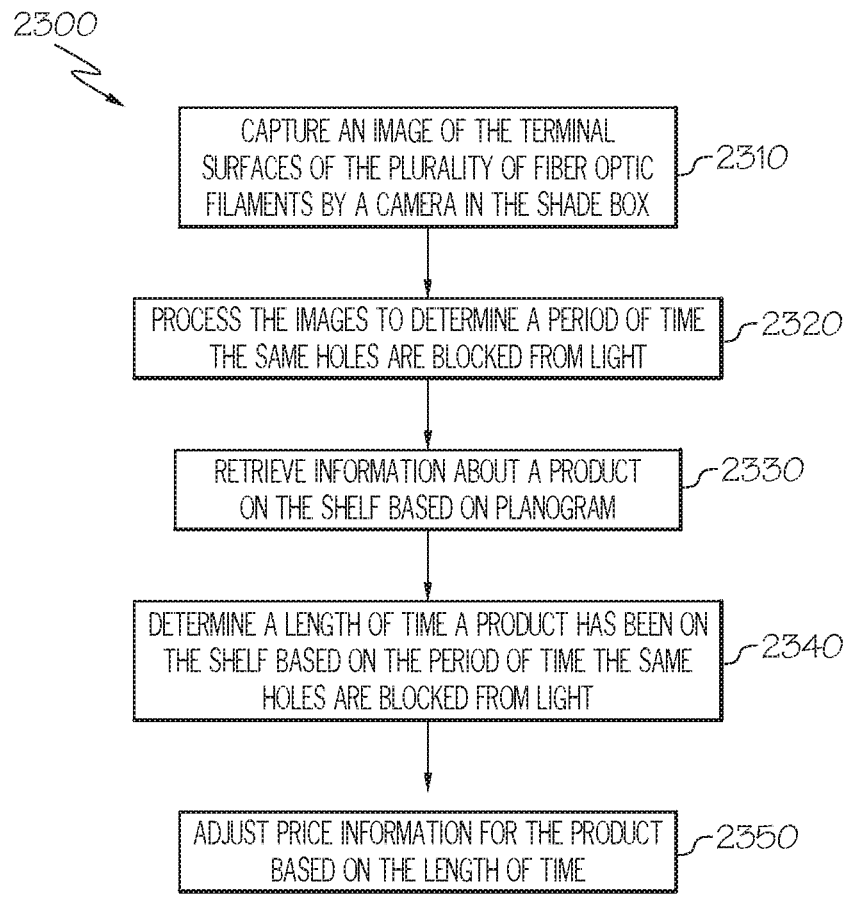
FIG. 23 graphically illustrates a computer-implemented method of determining a length of time a product has been on a shelf according to one or more embodiments shown and described herein.

Referring now to FIG. 23, a flowchart that graphically illustrates a method 2300 of determining a length of time a product has been on the shelf 101. At step 2310, the camera 320 in the shadow box 310 captures an image of the terminal surfaces 212 of the plurality of fiber optic filaments 108. The captured image is transmitted to the store computing system 400 via the computing network 1000.

At step 2320, the processor 430 of the store computing system 400 processes the captured image to determine a period of time the same holes are blocked from light. The details of determining whether a hole 104 is blocked from light are described above with reference to FIGS. 14 and 15. The period of time may be the number of days that the same holes are continuously blocked from light.

At step 2330, the processor 430 of the store computing system 400 retrieves information about products on the shelf 101 from the planogram stored in the store data repository 436a. The processor 430 of the store computing system 400 may retrieve dimension information (e.g., width, length, and height) about the products based on the planogram.

At step 2340, the processor 430 of the store computing system 400 determines a length of time products have been on the shelf 101 based on the period of time the same holes are blocked from light and the information about the product. For example, if the store computing system 400 determines that twenty holes 104 on the shelf 101 are blocked for 10 days, and the information about the product indicates that the average number of holes 104 blocked by one product on the shelf 101 is four, then the store computing system 400 determines that five products have been on the shelf 101 for 10 days.

At step 2350, the processor 430 of the store computing system 400 changes display content of the display unit 118 for the shelf 101 based on the length of time determined at step 2340. For example, the store computing system 400 may lower the price displayed in the display unit 118 if the length of time is greater than a predetermined period. As another example, the store computing system 400 may send a message to a retail associate device 230, or a mobile computing device 250 that the products on the shelf 101 need to be sold if the length of time is greater than a predetermined period.

Figure 24:
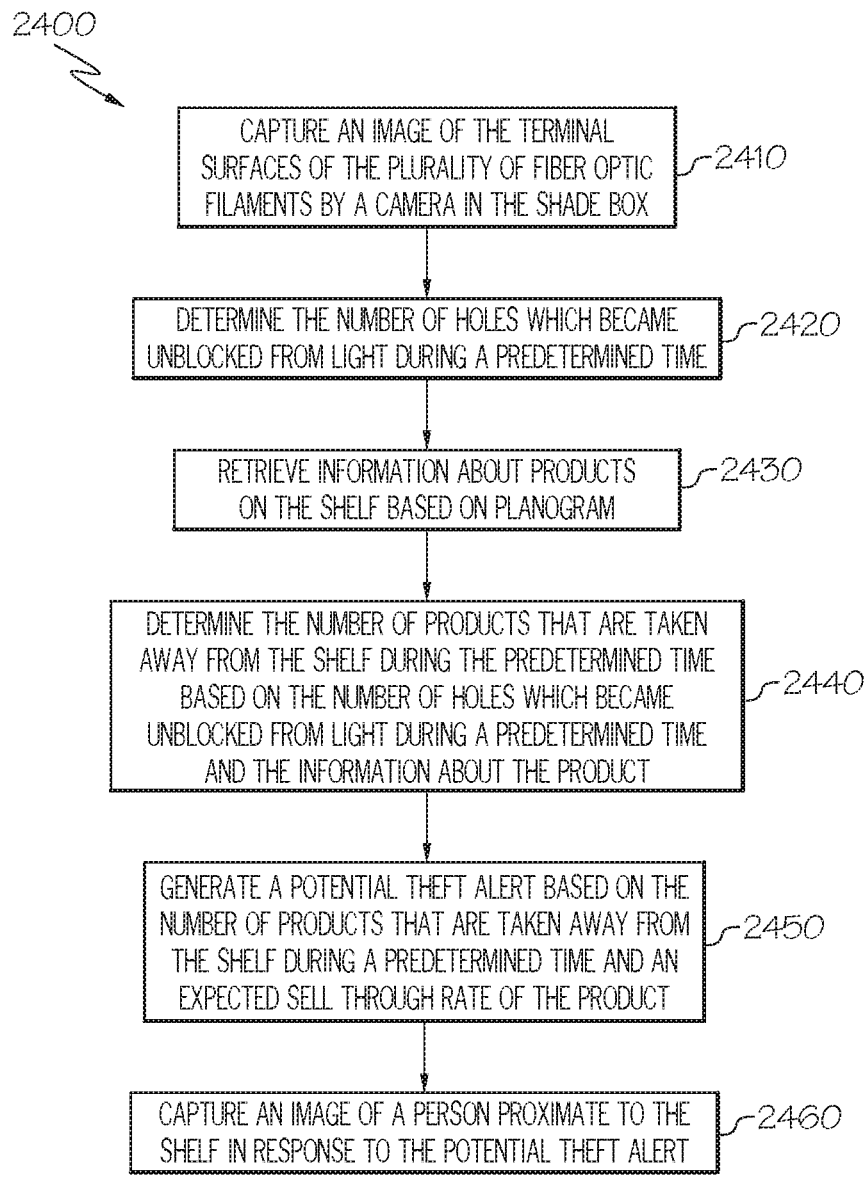
FIG. 24 graphically illustrates a computer-implemented method of detecting theft activities according to one or more embodiments shown and described herein.

Referring now to FIG. 24, a flowchart that graphically illustrates a method 2400 of detecting theft activities. At step 2410, the camera 320 in the shadow box 310 captures an image of the terminal surfaces 212 of the plurality of fiber optic filaments 108. The captured image is transmitted to the store computing system 400 via the computing network 1000.

At step 2420, the processor 430 of the store computing system 400 determines the number of holes 104 which become unblocked from light during a predetermined time. The store computing system 400 may determine the number of holes which become unblocked from light during the predetermined time by determining the number of terminal surfaces 212 whose brightness have substantially changed during the predetermined time. The predetermined time may be less than one minute, for example 20 seconds, 30 seconds, etc. The store computing system 400 may determine that the brightness of certain terminal surfaces 212 have substantially changed by referring to the change of pixel values for the terminal surfaces 212, e.g., as shown in FIG. 15.

At step 2430, the processor 430 of the store computing system 400 retrieves information about products on the shelf 101 from the planogram stored in the store data repository 436a. The information about the products includes price information for the product. The processor 430 of the store computing system 400 may retrieve dimension information (e.g., width, length, and height) about the product based on the planogram.

At step 2440, the processor 430 of the store computing system determines the number of products that are taken away from the shelf 101 during the predetermined time based on the number of holes determined at step 2430 and the information about the product. For example, if the processor 430 of the store computing system 400 determines that forty (40) holes 104 on the shelf 101 became unblocked from light during the predetermined time, and the information about the product indicates that the average number of holes 104 blocked by the product on the shelf 101 is four (4), then the store computing system 400 determines that ten products have been taken away from the shelf 101 during the predetermined time.

At step 2450, the processor 430 of the store computing system 400 generates a potential theft alert based on the number of products that are taken away from the shelf 101 during a predetermined time and an expected sell through rate of the product. The expected sell through rate of the product may be retrieved from the store data repository 436a. For example, the processor 430 of the store computing system 400 may instruct the lighting source 322 to light up such that the holes 104 on the top surface 102 of the shelf 101 are illuminated. As another example, the store computing system 400 may send a message to a retail associate device 230, or a mobile computing device 250 that indicates a potential theft. As another example, the store computing system 400 may instruct the camera 320 to capture an image of a customer proximate to the shelf 101.

Various other methods of managing store shelves may be implemented using the fiber optic shelving system. In one embodiment, the store computing system 400 may measure stocker productivity based on information received from the shelves 101. For example, the store computing system 400 may measure a time period between when an alert of low in stock or out of stock is sent out to employees and when the shelf 101 is restocked by the employees. The store computing system 400 may determine the time when the shelf 101 is restocked by monitoring the image captured by the camera 320 in the shadow box 310. Based on the measured time period, the store computing system 400 may determine productivity of employees with respect to restocking. The store computing system 400 may also measure a restocking rate as well as product rotation by measuring times when products are restocked.

In another embodiment, the store computing system 400 may determine whether a customer picks up a certain product on the shelf based on the image captured by the camera 320, product information associated with the shelf 101, and/or the image captured by the second camera 530. The store computing system 400 may automatically add the product to the customer's shopping list, such that the customer does not need to scan the product at the checkout. The store computing system 400 may also determine whether the customer puts the product back on the shelf based on the image captured by the camera 320, product information associated with the shelf 101, and/or the image captured by the second camera 530. The store computing system 400 may also determine whether a retail associate picks up a certain product on the shelf based on the image captured by the camera 320, product information associated with the shelf 101, and/or the image captured by the second camera 530.

In another embodiment, the store computing system 400 may determine inventory changes for a product during a certain period of time by monitoring the images captured by the camera 320, and compare the inventory changes for the product with the sale amounts of the product for the certain period of time. If the inventory changes are substantially different from the sale amounts, the store computing system 400 may alert a potential theft, spoilage of the product, etc.

It should now be understood that the systems described herein may determine the number of products on store shelves using fiber optic filaments. Such systems allow stores to accurately check inventory quantities in real time, check displayed orientation of products on the store shelves, facilitate restocking of products, determine products that are to be expired or decayed, and prevent theft activities.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fiber optic shelving system comprising:
    a shelf including a plurality of holes on a top surface of the shelf;
    a plurality of fiber optic filaments, each of the plurality of fiber optic filaments having a first end and a second end, and each first end being coupled to a different one of the plurality of holes;
    a holder configured to hold the second ends of the plurality of fiber optic filaments, the holder exposing terminal surfaces of the second ends of the plurality of fiber optic filaments;
    a first camera configured to capture an image of the terminal surfaces of the second ends of the plurality of fiber optic filaments;
    a second camera configured to capture an image of a side of one or more products on the shelf;
    one or more processors communicatively coupled to the first camera and the second camera;
    one or more memory components communicatively coupled to the one or more processors;
    and machine readable instructions stored in the one or more memory components that, when executed by the one or more processors, cause the fiber optic shelving system to:
        determine how many holes of the plurality of holes are blocked from light based on the captured image of terminal surfaces of the second ends of the plurality of fiber optic filaments; and
        determine a number of products on the shelf based on the number of holes blocked from light and the captured image of the side of one or more products on the shelf.

2. The fiber optic shelving system of claim 1, wherein the machine readable instructions stored in the one or more memory components further cause the fiber optic shelving system to:
    determine an orientation of a product on the shelf based on the captured image of the terminal surfaces of the second ends of the plurality of fiber optic filaments.

3. The fiber optic shelving system of claim 1, further comprising a light attached to a bottom surface of the shelf.

4. The fiber optic shelving system of claim 1, wherein the one or more memory components include planogram information for the shelf.

5. The fiber optic shelving system of claim 4, wherein determining the number of products on the shelf comprises:
   determining the number of products on the shelf based on the captured image of the terminal surfaces of the second ends of the plurality of fiber optic filaments, and the planogram information for the shelf.

6. The fiber optic shelving system of claim 4, wherein determining the number of products on the shelf comprises:
   determining the number of products on the shelf based on the captured image of the terminal surfaces of the second ends of the fiber optic filaments, the captured image of the side of one or more products on the shelf, and the planogram information for the shelf.

7. The fiber optic shelving system of claim 1, further comprising a lighting source configured to illuminate the terminal surfaces of the second ends of the plurality of fiber optic filaments.

8. The fiber optic shelving system of claim 1, further comprising a shadow box having an opening,
   wherein the holder is configured to be inserted to the opening, and the first camera is located within the shadow box.

9. The fiber optic shelving system of claim 1, wherein the top surface includes a flexible mat.

10. The fiber optic shelving system of claim 1, wherein the shelf includes a weight sensor.

11. The fiber optic shelving system of claim 1, further comprising:
    a display unit attached to an end of the shelf.

12. The fiber optic shelving system of claim 11, further comprising a mirror attached to a bottom surface of the shelf,
    wherein the mirror directs light from the display unit toward a top surface of another shelf.

13. The fiber optic shelving system of claim 1, wherein the machine readable instructions stored in the one or more memory components further cause the fiber optic shelving system to:
    determine whether a product on the shelf is expired based on visual characteristic of the terminal surfaces of the second ends of the plurality of fiber optic filaments.

14. The fiber optic shelving system of claim 7, wherein the machine readable instructions stored in the one or more memory components further cause the fiber optic shelving system to:
    determine whether a number of products on the shelf is less than a predetermined value; and
    turn on the light to illuminate the terminal surfaces of the second ends of the fiber optic filaments if the number of products on the shelf is less than the predetermined value.

15. The fiber optic shelving system of claim 1, wherein the machine readable instructions stored in the one or more memory components further cause the fiber optic shelving system to:
    determine a number of holes which became unblocked from light during a predetermined time;
    retrieve information about the product on the shelf;
    determine the number of products that are taken away from the shelf during the predetermined time based on the number of holes which became unblocked from light during the predetermined time and the information about the product; and
    generate a potential theft alert based on the number of products that are taken away from the shelf during the predetermined time and price of the product.

16. The fiber optic shelving system of claim 8, wherein the holder includes a retention mechanism that fixes the holder to the shadow box.

17. The fiber optic shelving system of claim 1, wherein the machine readable instructions stored in the one or more memory components further cause the fiber optic shelving system to:
    determine locations of the products on the shelf based on the captured image of the terminal surfaces of the second ends of the plurality of fiber optic filaments and the captured image of the side of one or more products on the shelf.

18. A fiber optic shelving system comprising:
    a first shelf including a first set of holes on a top surface of the first shelf;
    a second shelf including a second set of holes on a top surface of the second shelf;
    a first set of fiber optic filaments having first ends and second ends, each of the first ends of the first set of fiber optic filaments being coupled to a different one of the first set of holes;
    a second set of fiber optic filaments having first ends and second ends, each of the first ends of the second set of fiber optic filaments being coupled to a different one of the second set of holes;
    a first holder configured to hold the second ends of the first set of fiber optic filaments, the
    first holder exposing terminal surfaces of the second ends of the first set of fiber optic filaments;
    a second holder configured to hold the second ends of the second set of fiber optic filaments the second holder exposing terminal surfaces of the second ends of the second set of fiber optic filaments;
    a shadow box including a plurality of openings, each of the plurality of openings being configured to receive a holder;
    a first camera within the shadow box, the first camera configured to capture an image of the terminal surfaces of the second ends of the first set of fiber optic filaments and the terminal surfaces of the second ends of the second set of fiber optic filaments;
    a second camera configured to capture an image of a side of one or more products on the first shelf and one or more products on the second shelf;
    one or more processors communicatively coupled to the first camera;
    one or more memory components communicatively coupled to the one or more processors;
    and machine readable instructions stored in the one or more memory components that, when executed by the one or more processors, cause the fiber optic shelving system to:
    determine how may holes of the plurality of holes of the first shelf and the second shelf are blocked from light based on the captured image of terminal surfaces of the second ends of the first set of fiber optic filaments and the captured image of terminal surfaces of the second ends of the second set of fiber optic filaments; and
    determine a number of products on the first shelf and a number of products on the second shelf based on the number of holes of the first shelf and the second shelf blocked from light and the captured image of the side of one or more products on the first shelf and the second shelf.

19. The fiber optic shelving system of claim 18, further comprising:
a first display unit attached to an end of the first shelf; and
a second display unit attached to an end of the second shelf.

20. The fiber optic shelving system of claim 18, further comprising:
a first light attached to a bottom surface of the first shelf; and
a second light attached to a bottom surface of the second shelf.

21. The fiber optic shelving system of claim 18, wherein the machine readable instructions stored in the one or more memory components further cause the fiber optic shelving system to:
determine locations of products on the first shelf and locations of products on the second shelf based on the captured image of the terminal surfaces of the second ends of the first set of fiber optic filaments and the terminal surfaces of the second ends of the second set of fiber optic filaments.

22. A fiber optic shelving system comprising:
a shelf including a plurality of holes on a top surface of the shelf;
a plurality of caps integrated in the plurality of holes;
a plurality of fiber optic filaments, each of the plurality of fiber optic filaments having a first end and a second end, and each first end being detachably coupled to a different one of the plurality of caps;
a holder configured to hold the second ends of the plurality of fiber optic filaments, the holder exposing terminal surfaces of the second ends of the plurality of fiber optic filaments;
a first camera configured to capture an image of the terminal surfaces of the second ends of the plurality of fiber optic filaments;
one or more processors communicatively coupled to the first camera;
one or more memory components communicatively coupled to the one or more processors;
and machine readable instructions stored in the one or more memory components that, when executed by the one or more processors, cause the fiber optic shelving system to:
determine how many holes of the plurality of holes are blocked from light based on the captured image of terminal surfaces of the second ends of the plurality of fiber optic filaments; and
determine a number of products on the shelf based on the number of holes blocked from light.

23. The fiber optic shelving system of claim 22, wherein the plurality of caps are in a cone shape.

24. The fiber optic shelving system of claim 22, further comprising a second camera configured to capture an image of a side of one or more products on the shelf.

25. The fiber optic shelving system of claim 22, further comprising a light attached to a bottom surface of the shelf.

26. The fiber optic shelving system of claim 22, wherein the top surface includes a flexible mat.

27. The fiber optic shelving system of claim 22, further comprising:
a display unit attached to an end of the shelf.

28. The fiber optic shelving system of claim 27, further comprising a mirror attached to a bottom surface of the shelf,
wherein the mirror directs light from the display unit toward a top surface of another shelf.

29. The fiber optic shelving system of claim 22, wherein the machine readable instructions stored in the one or more memory components further cause the fiber optic shelving system to:
determine locations of the products on the shelf based on the captured image of the terminal surfaces of the second ends of the plurality of fiber optic filaments.

30. The fiber optic shelving system of claim 1, wherein when executed by the one or more processors, the machine readable instructions stored in the one or more memory components further cause the fiber optic shelving system to:
determine stacking information about whether one product is stacked over another product on the shelf based on the captured image of the side of the one or more products on the shelf; and
determine the number of products on the shelf based on the captured image of the terminal surfaces of the second ends of the plurality of fiber optic filaments and the stacking information.

* * * * *